(12) United States Patent
Takigawa et al.

(10) Patent No.: US 8,103,192 B2
(45) Date of Patent: Jan. 24, 2012

(54) CONSTANT VELOCITY JOINT AND IMAGE FORMING APPARATUS

(75) Inventors: Junya Takigawa, Tokyo (JP); Yoshimi Asayama, Mie (JP)

(73) Assignees: Ricoh Company, Ltd., Tokyo (JP); NTN Corporation, Osaka (JP)

( * ) Notice: Subject to any disclaimer, the term of this patent is extended or adjusted under 35 U.S.C. 154(b) by 714 days.

(21) Appl. No.: 12/222,853

(22) Filed: Aug. 18, 2008

(65) Prior Publication Data

US 2009/0054164 A1 Feb. 26, 2009

(30) Foreign Application Priority Data

Aug. 21, 2007 (JP) .................................. 2007-215281

(51) Int. Cl.
*G03G 15/00* (2006.01)
(52) U.S. Cl. .................. 399/167; 399/137; 399/145
(58) Field of Classification Search .................. 399/159, 399/167, 116, 117, 36; 464/904–906; 384/523, 384/528

See application file for complete search history.

(56) References Cited

U.S. PATENT DOCUMENTS

2006/0061829 A1* 3/2006 Yamazaki et al.

FOREIGN PATENT DOCUMENTS

| JP | 52-34699 | 9/1977 |
|---|---|---|
| JP | 2005-017758 | 1/2005 |
| JP | 2006-106681 | 4/2006 |
| JP | 2006-118703 | 5/2006 |

* cited by examiner

*Primary Examiner* — David Gray
*Assistant Examiner* — Laura Roth
(74) *Attorney, Agent, or Firm* — Harness, Dickey & Pierce, P.L.C.

(57) ABSTRACT

Example embodiments relate to a constant velocity joint having an outer ring including an annular space with an open end, plural outer grooves axially extending in an outer wall of the annular space and being equally spaced from each other in a circumferential direction, and plural inner grooves axially extending in an inner wall of the annular space and facing the respective outer grooves, and a cage configured to hold balls that slide along the inner walls and the outer walls. The outer ring and/or the cage may be made of a synthetic resin. A drive force of one of the cage and the outer ring may be transmitted to the other one of the cage and the outer ring when part of the cage may be inserted in the annular space and the balls held by the cage may be engaged in the inner grooves and the outer grooves.

11 Claims, 20 Drawing Sheets

ATTACHING UNIT →

UNIT ATTACHED

CONSTANT VELOCITY JOINT AND IMAGE FORMING APPARATUS

BACKGROUND OF THE INVENTION

1. Field of the Invention

The present invention relates to a constant velocity joint and an image forming apparatus.

2. Description of the Related Art

Constant velocity joints are known as one of drive force transmission mechanisms that transmit a rotating torque of an automobile drive shaft to an axle. The constant velocity joints can transmit a drive force at a constant rotational speed between a drive shaft of the drive side and an axially aligned driven shaft of the driven side while allowing an angular offset between the drive shafts. The constant velocity joints are used not only in automobiles but also in other devices. For example, Japanese Patent Laid-Open Publication No. 2006-106681 (Patent Document 1) discloses an image forming apparatus that uses a constant velocity joint for connecting an output shaft of a drive motor and a rotary shaft of a photoreceptor.

Triball joints, such as one disclosed in Japanese Examined Patent Publication No. 52-34699 (Patent Document 2), are commonly known as constant velocity joints. The triball joints include an outer ring and a cage, which are axially aligned. The outer ring includes an annular space having one open end. Axially extending outer grooves are formed in the outer wall of the annular space at 120° angular intervals in the circumferential direction. Further, axially extending inner grooves are formed in the inner wall of the annular space to oppose the outer grooves. In the cage, ball holding holes are formed, at 120° angular intervals in the circumferential direction, in a peripheral wall forming a hollow cylinder that is inserted into the annular space of the outer ring. A ball is held in each ball holding hole. The cage is inserted into the annular space of the outer ring such that the balls engage the outer and inner grooves. Then, if one of the outer ring and the cage rotates as the drive side, the rotational force of the drive side is transmitted to the driven side via the plural balls engaged by the inner and outer grooves.

Japanese Patent Laid-Open Publication NO. 2006-118703 (Patent Document 3) discloses a constant velocity joint as described below. The inner wall of an annular space of an outer ring includes an extension portion extending from open-side end points of inner grooves. In this extension portion, inner wall tapered portions extending from the open-side end points of the corresponding inner grooves toward the open end of the inner wall are formed such that the inner diameter of the annular space and the groove width of the inner wall tapered portions increase from the open-side end points of the inner grooves toward the open end of the inner wall. The outer wall of the annular space includes another extension portion extending from open-side end points of outer grooves. In this extension portion, outer wall tapered portions extending from the open-side end points of the corresponding outer grooves toward the open end of the outer wall are formed such that the outer diameter of the annular space and the groove width of the outer wall tapered portions increase from the open-side end points of the outer grooves toward the open end of the outer wall.

According to the constant velocity joint of Patent Document 3, when the cage is moved axially to be partly inserted into the annular space of the outer ring such that a ball held by the cage engages the inner and outer grooves of the outer ring, if there is a phase difference between the ball and the inner and outer grooves, the ball comes into contact with the outer wall tapered portion and the inner wall tapered portion. When the cage is axially moved with the ball in contact with the outer wall tapered portion and the inner wall tapered portion in order to be partly inserted into the outer ring, part of an axial force that moves the cage axially is converted into a rotational force by the outer wall tapered portion and the inner wall tapered portion. Thus the outer ring is rotated relative to the cage, so that the phase of the ball matches the phase of the grooves (the inner groove and the outer groove). In this way, the outer ring is rotated relative to the cage by the axial movement of the cage, so that the phase of the ball matches the phase of the grooves (inner and outer grooves). Thus the ball held by the cage can easily engage the inner groove and the outer groove of the outer ring.

However, the problem with the constant velocity joint of Patent Document 3 is that, in some cases, it is sometimes difficult to move the cage axially to smoothly insert the ball held by the cage into the annular space between the outer groove and the inner groove of the outer ring.

The inventors of the present invention have investigated the problem and found the following.

FIG. 19 is a diagram illustrating how balls 252 held by a cage 250 of Patent Document 2 engage an annular space 244 of an outer ring 240. Note that FIG. 19 is a cut-away side view, in the direction perpendicular to the axial direction, of the constant velocity joint viewed from the side of the cage 250.

Referring to FIG. 19, when the ball 252 is guided by an outer wall tapered portion 245a and a corresponding inner wall tapered portion 246a to engage an outer groove 245, the ball 252 becomes lodged at the junction of an axial edge 245b of the outer wall tapered portion 245a and an edge of the outer groove 245. This increases the insertion resistance, so that the ball 252 cannot be smoothly inserted into the annular space 244 between the outer groove 245 and a corresponding inner groove 246 of the outer ring 240.

Further, referring also to FIG. 20, when there is an about 60° phase difference between the ball 252 and the grooves (the inner groove 246 and the outer groove 245), the ball 252 comes into contact with a straight portion J between the adjacent inner wall tapered portions 246a. Therefore, the axial force exerted on the inner wall of the annular space 244 cannot be converted into a rotational force. Only part of the axial force exerted on the outer wall tapered portion 245a is converted into a rotational force. Thus, the force that rotates the outer ring 240 or the cage 250 is reduced, so that the outer ring 240 does not smoothly rotate relative to the cage 250. As a result, the ball 252 held by the cage 250 cannot be smoothly inserted into the annular space 244 between the outer groove 245 and the inner groove 246 of the outer ring 240.

SUMMARY OF THE INVENTION

In view of the foregoing, the present invention is directed toward providing a constant velocity joint and an image forming apparatus that allow smooth insertion of balls held by a cage into annular space between outer grooves and inner grooves of an outer ring.

In an embodiment of the present invention, there is provided a constant velocity joint that comprises an outer ring including an annular space with an open end, plural outer grooves axially extending in an outer wall of the annular space and being equally spaced from each other in a circumferential direction, and plural inner grooves axially extending in an inner wall of the annular space and facing the respective outer grooves; and a cage configured to hold balls that slide along the inner walls and the outer walls. The outer ring and/or the cage is made of a synthetic resin. A drive force of one of the cage and the outer ring is transmitted to the other one of the cage and the outer ring when part of the cage is inserted in the annular space and the balls held by the cage are engaged in the inner grooves and the outer grooves. The inner wall includes an extension portion extending from open-side end points of the inner grooves toward the cage. Inner wall tapered portions extending from the open-side end points of the corresponding inner grooves toward an open end of the inner wall are formed in the extension portion such that the diameter of the annular space and the groove width of the inner wall tapered portions increase from the open-side end points of the inner grooves toward the open end of the inner wall. The open-side end points of the inner grooves are closer to the open end of the annular space than open-side end points of the outer grooves are.

According to the above described embodiment, because the open-side end points of the inner grooves are closer to the open end of the annular space than open-side end points of the outer grooves are, the balls first engage the inner grooves and then the outer grooves. Therefore, when the ball engages the outer groove, the phase of the ball is already matched with the phase of the outer groove, and the ball does not become lodged at the junction of the axial edge of an outer wall tapered portion and an edge of the outer groove. As a result, it is possible to reduce the resistance of the ball held by the cage to insertion into the annular space between the outer groove and the inner groove of the outer ring, thereby allowing smooth insertion of the ball into the annular space between the outer groove and the inner groove.

In an embodiment of the present invention, there is provided a constant velocity joint that comprises an outer ring including an annular space with an open end, three outer grooves axially extending in an outer wall of the annular space at 120° angular intervals in a circumferential direction, and three inner grooves axially extending in an inner wall of the annular space and facing the respective outer grooves; and a cage including a ball holding portion configured to hold balls such that the balls slide along the inner walls and the outer walls at 120° angular intervals in the circumferential direction. The outer ring and/or the cage is made of a synthetic resin. A drive force of one of the cage and the outer ring is transmitted to the other one of the cage and the outer ring when the ball holding portion is inserted in the annular space and the balls held by the ball holding portion are engaged in the inner grooves and the outer grooves. The inner wall includes an extension portion extending from open-side end points of the inner grooves toward the cage. Inner wall tapered portions having tapered shapes and extending from the open-side end points of the corresponding inner grooves toward an open end of the inner wall are formed in the extension portion such that the diameter of the annular space and the groove width of the inner wall tapered portions increase from the open-side end points of the inner grooves toward the open end of the inner wall. The edges of the adjacent inner wall tapered portions intersect at the open end of the inner wall.

According to the above described embodiment, because the edges of the adjacent inner wall tapered portions intersect at the open end of the inner wall, when inserting the ball held by the cage into the annular portion between the inner groove and the outer groove, even if there is a phase difference of about 60° between the ball and the inner and outer grooves, it is possible to bring the ball into contact with the open end of the inner wall tapered portion. Therefore, even if there is a phase difference of about 60° between the ball and the inner and outer grooves, part of an axial force that is applied to the inner wall of the annular space can be converted into a rotational force by the inner wall tapered portion, thereby allowing smooth rotation of the cage relative to the outer ring. As a result, it is possible to reduce the resistance of the ball held by the cage to insertion into the annular space between the outer groove and the inner groove of the outer ring, thereby allowing smooth insertion of the ball into the annular space between the outer groove and the inner groove.

In an embodiment of the present invention, there is provided an image forming apparatus that comprises a unit that includes a rotating body and is removably attached to an apparatus body; and a connection unit configured to connect a driven shaft provided in the unit to a drive shaft provided in the apparatus body. The driven shaft is configured to transmit a drive force to the rotating body, and the drive shaft is configured to be rotated by a drive force of a drive source. The connection unit is one of the above-described constant velocity joints.

According to an aspect of the present invention, it is possible to reduce the resistance to insertion of the balls held by the cage into the annular space between the outer grooves and the inner grooves of the outer ring, thereby allowing easy engagement of the cage and the outer ring.

DETAILED DESCRIPTION OF THE PREFERRED EMBODIMENT

An electrophotographic printer (hereinafter referred to simply as a printer) as an image forming apparatus of an embodiment of the present invention is described below.

Figure 1:
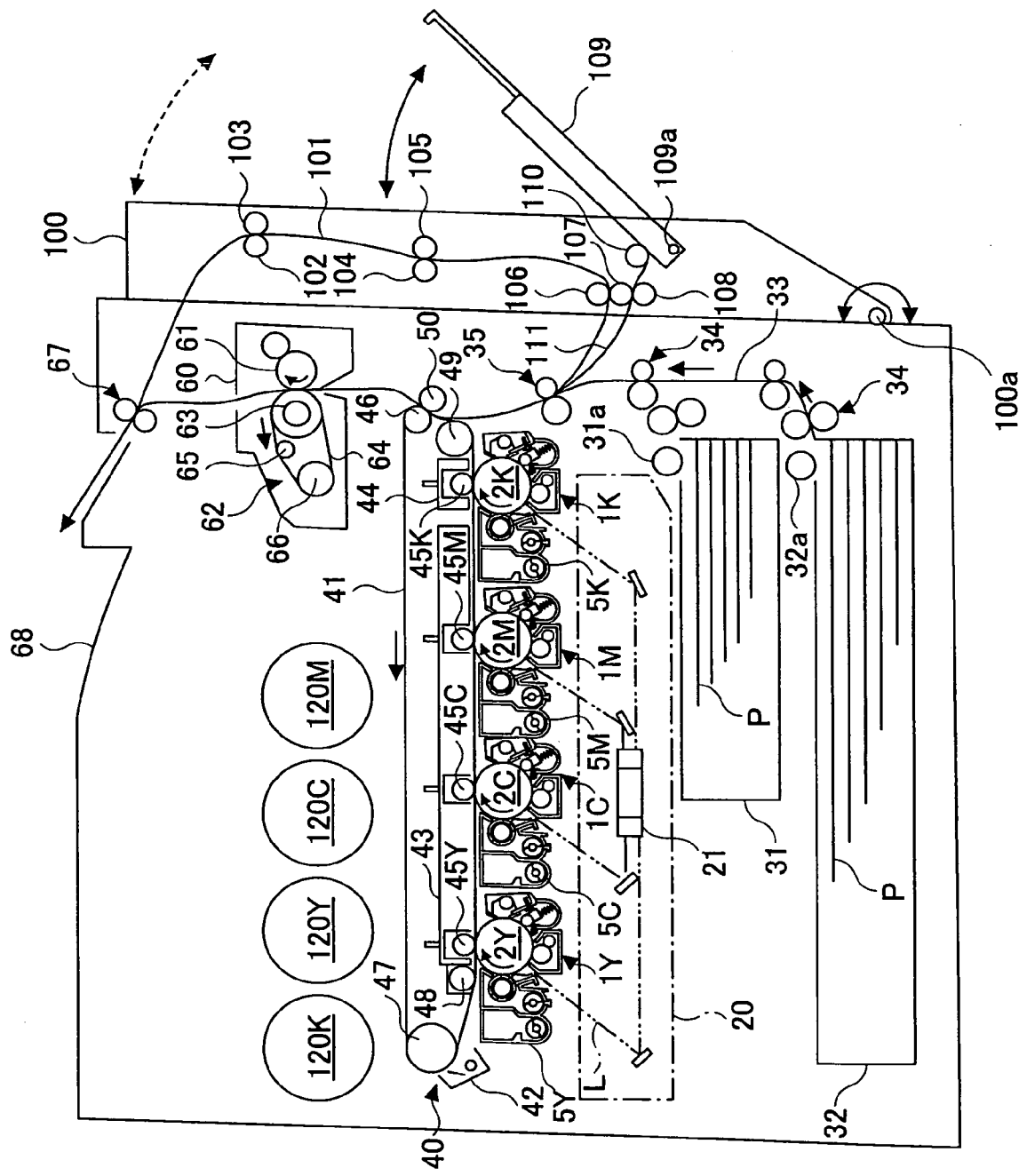
FIG. 1 is a schematic configuration diagram illustrating a printer according to an embodiment.

First, the basic configuration of the printer is described below. FIG. 1 is a schematic configuration diagram illustrating the printer. Referring to FIG. 1, the printer includes four process cartridges 1Y, 1C, 1M, and 1K for creating toner images of yellow, cyan, magenta, and black (hereinafter referred to as Y, C, M, and K, respectively), respectively. Although the process cartridges 1Y, 1C, 1M, and 1K use toners of different colors, namely, Y, C, M, and K, the process cartridges 1Y, 1C, 1M, and 1K have the same configuration. The process cartridges 1Y, 1C, 1M, and 1K are replaced when their service lives are over. It is to be noted that because the process cartridges 1Y, 1C, 1M, and 1K have the same configuration, their reference characters Y, C, M, and K indicating the colors of the corresponding toners are omitted in the following description.

Figure 2:
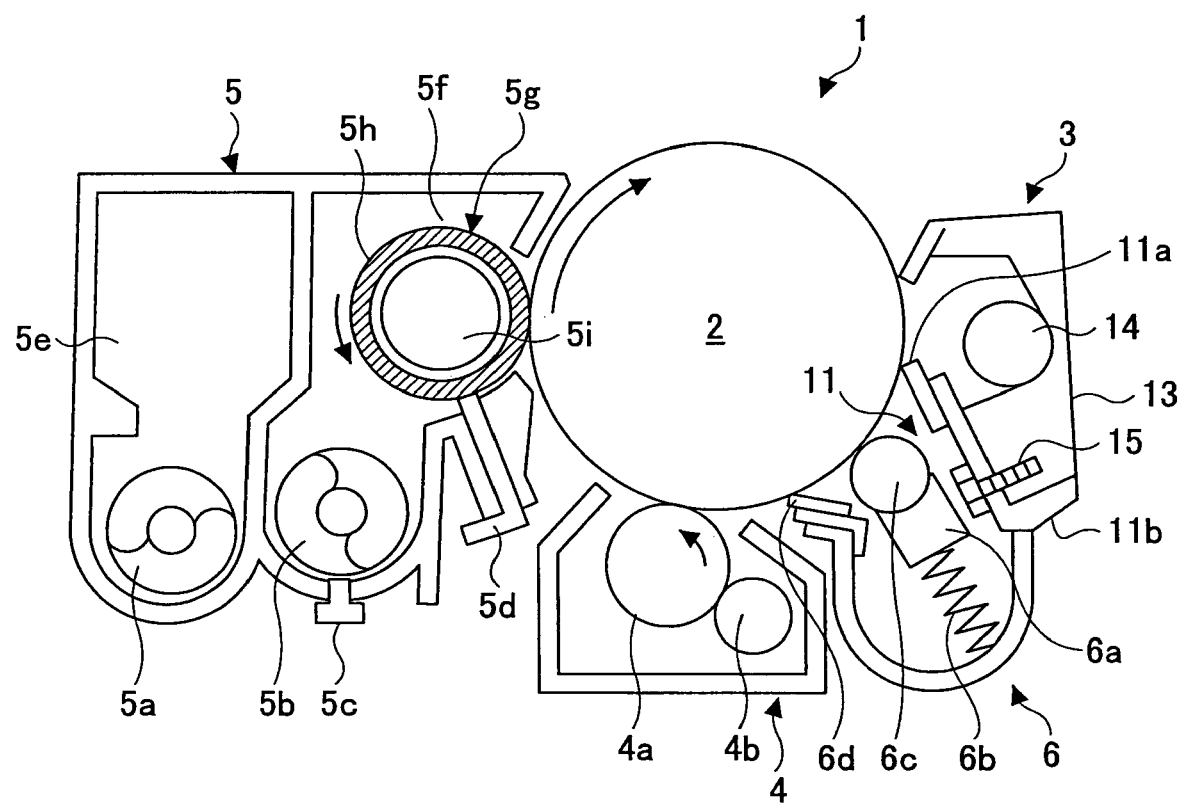
FIG. 2 is an enlarged view illustrating a process cartridge.

Referring to FIG. 2, the process cartridge 1 includes, inside a frame (not shown), a drum-type photoreceptor 2, a drum cleaning unit 3, a charging unit 4, a developing unit 5, and a lubricant application unit 6. The process cartridge 1 is removable from the printer body to allow consumable parts to be replaced all at once.

The charging unit 4 uniformly charges the surface of the photoreceptor 2 being rotated clockwise (as viewed in FIG. 2) by a drive unit (not shown). The charging unit 4 of FIG. 2 is a non-contact charging roller type and is configured to cause a charging roller 4a (a rotating body), which rotates counterclockwise (as viewed in FIG. 2), to uniformly charge the photoreceptor 2 without contact with the photoreceptor 2, while receiving a charging bias from a power supply (not shown). Note that other types of charging units such as a scorotron type, a corotron type, and contact roller type may alternatively be used as the charging unit 4.

The charging bias may be applied to the contact type or non-contact type charging roller 4a by superposing an alternating current on a direct current, or by applying only a direct current. The charging bias that superposes an alternating current on a direct current in the contact type charging roller 4a is advantageous in that, even if the resistance of the charging roller 4a fluctuates in response to an environmental change due to constant current control of an alternating current, the surface potential of the charging roller 4a is not affected by the fluctuation of the resistance. However, this increases the cost of a power supply unit and has a problem of noise due to high frequency alternating current. On the other hand, in the case of the non-contact type charging roller 4a, the surface of the photoreceptor cannot be uniformly charged using a charging bias that superposes an alternating current on a direct current because of influence of fluctuation of the gap between the photoreceptor 2 and the charging roller 4a, resulting in uneven density in an image. Therefore, a unit for correcting the charging bias according to the gap fluctuation is needed.

The charging roller 4a may be rotated by rotation of the photoreceptor 2, or may be driven with a drive force received via a gear or the like from the drive source that drives the photoreceptor 2. In the case of low speed machines, it is common to rotate the charging roller 4a by rotation of the photoreceptor 2. In the case of machines that are required to provide high speed performance and high quality images, it is common to drive the charging roller 4a with a drive force received from the drive source that drives the photoreceptor 2.

In FIG. 2, a charging roller cleaner 4b is provided that cleans the surface of the charging roller 4a to prevent the photoreceptor 2 from becoming unable to be charged to a target voltage due to contaminants adhering to the charging roller 4a. This prevents defective images due to insufficient charging. The charging roller cleaner 4b is typically formed of melanin and is configured to rotate together with the charging roller 4a.

The developing unit 5 includes a first developer container 5e in which a first transport screw 5a is disposed. The developing unit 5 further includes a second developer container 5f, which is provided with a toner concentration sensor 5c including a magnetic permeability sensor, a second transport screw 5b, a developing roller 5g, and a doctor blade 5d. These two developer containers 5e and 5f hold a developer (not shown) containing a magnetic carrier and negatively charged toner. The first transport screw 5a is rotated by a drive unit (not shown) to transport the developer in the first developer container 5e from the near side to the far side (as viewed in FIG. 2). Then the developer passes through an opening (not shown) in a partition wall between the first developer container 5e and the second developer container 5f and enters the second developer container 5f. The second transport screw 5b in the second developer container 5f is rotated by a drive unit (not shown) to transport the developer from the far side to the near side (as viewed in FIG. 2). The toner concentration sensor 5c, which is fixed at the bottom of the second developer container 5f, detects the toner concentration of the developer being transported. At the upper side of the second transport screw 5b for transporting the developer, a developing roller 5g is disposed inside a developing sleeve 5h, which is rotated counterclockwise (as viewed in FIG. 2). A magnet roller 5i is disposed inside the developing roller 5g. The developer being transported by the second transport screw 5b moves to the surface of the developing sleeve 5h due to a magnetic force of the magnet roller 5i. After the amount of the developer is regulated by the doctor blade 5d, which is spaced apart from the developing sleeve 5h by a predetermined distance, the developer is transported to a developing area facing the photoreceptor 2, so that the toner adheres to an electrostatic latent image on the photoreceptor 2. Thus a toner image is formed on the photoreceptor 2. After the toner is used for developing the image, the developer returns to the second transport screw 5b by rotation of the developing sleeve 5h of the developing roller 5g. When the developer is transported to the near side (as viewed in FIG. 2), the developer returns to the first developer container 5e through an opening (not shown).

The detection result of the magnetic permeability of the toner concentration sensor 5c is transmitted as a voltage signal to a control unit (not shown). Because the magnetic permeability of the developer is correlated with the toner concentration of the developer, the toner concentration sensor 5c outputs a voltage value corresponding to the toner concentration of the toner. The control unit includes a RAM that stores data of a target output voltage Vtref of the toner concentration sensor 5c. The developing unit 5 compares the value of the output voltage of the toner concentration sensor 5c and the target output voltage Vtref, and drives a toner supply device (not shown) for a period of time according to the comparison result. Thus, in the first developer container 5e, an appropriate amount of toner is supplied to the developer of which toner concentration has been reduced due to the use of toner for developing the image. In this way, the toner concentration of the developer in the second developer container 5f is maintained within a predetermined range.

The cleaning unit 3 is configured to remove residual toner that has not been transferred to the photoreceptor 2 and remains on the surface of the photoreceptor 2. The cleaning unit 3 includes a cleaning blade 11a that abuts the surface of the photoreceptor 2 in a counter direction. The cleaning unit 3 further includes a collection unit 11b that collects the residual toner removed from the surface of the photoreceptor 2 by the cleaning blade 11a. A transport auger 14 that transports the toner collected in the collection unit 11b to a waste toner bottle (not shown) is provided in the collection unit 11b.

The residual toner on surface of the photoreceptor 2 is removed by the cleaning blade 11a. The residual toner accumulated on the edge of the cleaning blade 11a falls into the collection unit 11b. Then the residual toner is transported as waste toner by the transport auger 14 to the waste toner bottle (not shown) and stored therein. The waste toner stored in the waste toner bottle is collected by a maintenance personnel or the like. In an alternative embodiment, the residual toner collected in the collection unit 11b may be transported as recycle toner to the developing unit 5 so as to be used again for development.

The lubricant application unit 6 applies a solid lubricant 6a, which is formed by molding lubricant, onto the surface of the photoreceptor 2 for reducing the friction coefficient of the surface of the photoreceptor 2. The solid lubricant 6a is pressed against a rotating fur brush 6c by a pressure spring 6b, so that the lubricant is applied to the photoreceptor 2 by the fur brush 6c. Zinc stearate is most commonly used as the lubricant. Insulating PET, conductive PET, acrylic fiber or the like may be used as the brush of the fur brush 6c. The lubricant applied on the surface of the photoreceptor 2 is made to have a uniform thickness and is fixed to the surface of the photoreceptor 2 by a lubricant application blade 6d. Application of the lubricant on the surface of the photoreceptor 2 prevents filming of the photoreceptor 2.

Referring back to FIG. 1, an optical writing unit 20 is disposed under the process cartridges 1Y, 1C, 1M, and 1K. The optical writing unit 20 is a latent image forming unit and is configured to emit laser beams L onto each photoreceptor of the process cartridges 1Y, 1C, 1M, and 1K according to image information. Thus, Y, C, M, and K electrostatic latent images are formed on the photoreceptors 2Y, 2C, 2M, and 2K, respectively. The optical writing unit 20 deflects the laser beams L, which are emitted from the light source, using a polygon mirror 21 and directs the laser beams L onto the corresponding photoreceptors 2Y, 2C, 2M, and 2K via plural optical lenses and mirrors. The polygon mirror 21 is rotatable by a motor.

Under the optical writing unit 20, a first sheet feed cassette 31 and a second sheet feed cassette 32 are aligned vertically. Plural transfer sheets P as transfer media are stacked in each of the sheet feed cassettes 31 and 32. A first sheet feed roller 31a and a second sheet feed roller 32a are in contact with the top sheets P in the first sheet feed cassette 31 and the second sheet feed cassette 32, respectively. When the first sheet feed roller 31a is rotated counterclockwise by a drive unit (not shown), the top transfer sheet P in the first sheet feed cassette 31 is discharged toward a sheet feed passage 33 vertically extending at the right side (as viewed in FIG. 1) of the sheet feed cassettes 31 and 32. When the second sheet feed roller 32a is rotated counterclockwise by a drive unit (not shown), the top transfer sheet P in the second sheet feed cassette 32 is discharged toward the sheet feed passage 33. Plural transport roller pairs 34 are disposed inside the sheet feed passage 33. The transfer sheet P fed to the sheet feed passage 33 passes through the nip between the rollers of each transport roller pair 34 to be transported from the lower side to the upper side (as viewed in FIG. 1) in the sheet feed passage 33.

A resist roller pair 35 is disposed at the end of the sheet feed passage 33. When the transfer sheet P fed by the transport roller pairs 34 is nipped between the rollers of the resist roller pair 35, the resist roller pair 35 stops rotating. Then the resist roller pair 35 restarts rotating to transport the transfer sheet P toward a secondary transfer nip (described below) at an appropriate timing.

A transfer unit 40 is disposed at the upper side of the process cartridges 1Y, 1C, 1M, and 1K. The transfer unit 40 includes an intermediate transfer belt 41 that endlessly moves counterclockwise. The transfer unit 40 includes, in addition to the intermediate transfer belt 41, a belt cleaning unit 42, a first bracket 43, and a second bracket 44. The transfer unit 40 further includes four primary transfer rollers 45Y, 45C, 45M, and 45K, a secondary transfer backup roller 46, a drive roller 47, an auxiliary roller 48, and a tension roller 49. The intermediate transfer belt 41 extends around these eight rollers, and is endlessly moved counterclockwise by rotation of the drive roller 47. The intermediate transfer belt 41 is nipped between the four primary transfer rollers 45Y, 45C, 45M, and 45K and the photoreceptors 2Y, 2C, 2M, and 2K, respectively, forming primary transfer nips. A transfer bias of a polarity (e.g., positive) opposite to that of the toner is applied to the back surface (inner surface) of the intermediate transfer belt 41. While moving endlessly, the intermediate transfer belt 41 passes through the Y, C, M, and K primary transfer nips, so that the Y, C, M, and K toner images on the photoreceptors 2Y, 2C, 2M, and 2K are transferred onto the outer surface of the intermediate transfer belt 41 and superposed on each other (primary transfer). Thus, a four-color superposed toner image (hereinafter referred to as a "four-color toner image") is formed on the intermediate transfer belt 41.

The secondary transfer backup roller 46 and a secondary transfer roller 50, which is disposed outside the loop of the intermediate transfer belt 41, form a secondary transfer nip through which the intermediate transfer belt 41 moves. The above-described resist roller pair 35 feeds the transfer sheet P toward the secondary transfer nip at a timing in synchronization with the four-color toner image on the intermediate transfer belt 41. Nip pressure and a secondary transfer electric field, which field is formed between the secondary transfer backup roller 46 and the secondary transfer roller 50 by application of secondary transfer bias, cause the four-color toner image on the intermediate transfer belt 41 to be transferred onto the transfer sheet P (secondary transfer) in the secondary transfer nip. With the white color of the transfer sheet P, the four-color toner image forms a full-color toner image.

Toner that is not transferred onto the transfer sheet P in the secondary transfer nip remains on the intermediate transfer belt 41. The remaining toner is removed by the belt cleaning unit 42.

A fixing unit 60 including a pressure roller 61 and a fixing belt unit 62 is disposed at the upper side of the secondary transfer nip. The fixing belt unit 62 of the fixing unit 60 causes a fixing belt 64 to endlessly move around a heating roller 63, a tension roller 65, and a drive roller 66 in the counterclockwise direction. The heating roller 63 includes a heat source, such as a halogen lamp, that heats the fixing belt 64 from the inner side. The pressure roller 61, which rotates clockwise, abuts the outer surface of the fixing belt 64 at a position opposing the heating roller 63. Thus the pressure roller 61 and the fixing belt 64 form a fixing nip.

The transfer sheet P that has passed through the secondary transfer nip is separated from the intermediate transfer belt 41 and is fed into the fixing unit 60. While passing through the fixing nip from the lower side to the upper side, the transfer sheet P is heated by and pressed against the fixing belt 64, so that the full-color toner image is fixed onto the transfer sheet P.

After this fixing process, the transfer sheet P passes through between rollers of a sheet ejection roller pair 67 and is ejected out of the printer. A stacker section 68 is provided on an upper surface of a casing of the printer body. The transfer sheets P ejected from the printer by the sheet ejection roller pair 67 are stacked one on another in the stacker section 68.

Four toner cartridges 120Y, 120C, 120M, and 120K that hold Y, C, M, and K toners are disposed at the upper side of the transfer unit 40. The Y, C, M, and K toners in the toner cartridges 120Y, 120C, 120M, and 120K are appropriately supplied to the developing units of the process cartridges 1Y, 1C, 1M and 1K. The toner cartridges 120Y, 120C, 120M, and 120K are removable from the printer body independently from the process cartridges 1Y, 1C, 1M and 1K.

In the printer with the above-described configuration, the four process cartridges 1Y, 1C, 1M and 1K, the optical writing unit 20, the transfer unit, 40, etc., form a toner image forming unit that forms a toner image on the transfer sheet P (recording medium).

Figure 3A:
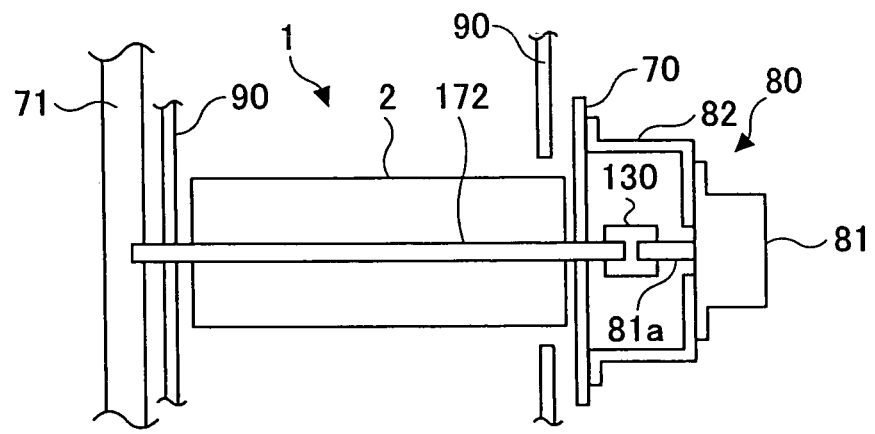
FIG. 3A is a cut-away side view illustrating the process cartridge attached to a printer and the vicinity thereof.
Figure 3B:
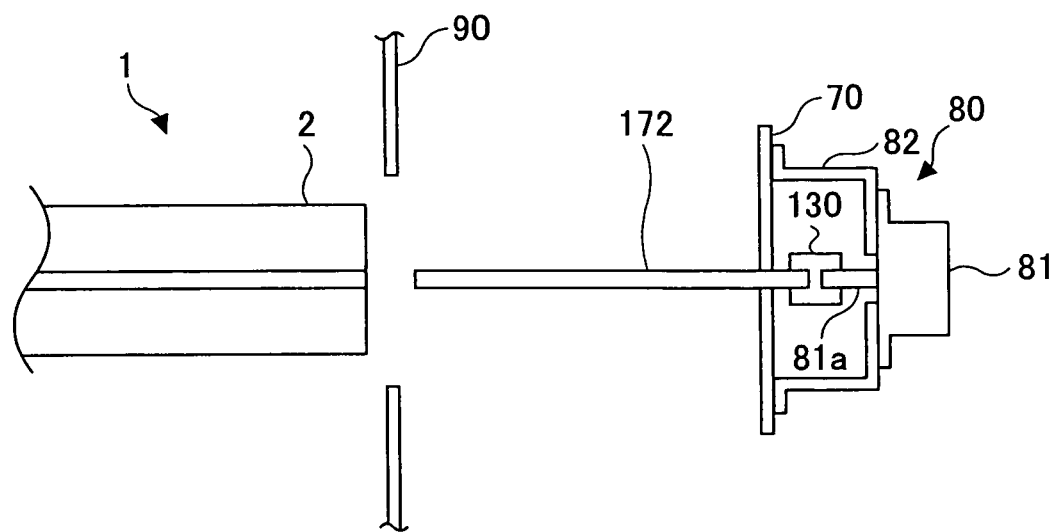
FIG. 3B is a cut-away side view illustrating the process cartridge removed from a printer and the vicinity thereof.

FIG. 3A is a cut-away side view illustrating the process cartridge 1 attached to the printer. FIG. 3B is a cut-away side view illustrating the process cartridge 1 removed from the printer and the vicinity thereof. The left side in these figures indicates the front of the printer and the right side indicates the rear of the printer. Referring to FIG. 3A, the process cartridge 1 is a unit removable from the apparatus body and includes a rotating body. The process cartridge 1 is disposed between a front plate 71 near the front of the printer body and a rear plate 70 of the printer body. Referring to FIG. 3B, a center hole is formed extending through the center of a cylindrical photoreceptor 2 from its axial end to the other axial end. The rear plate 70 rotatably supports a photoreceptor shaft 172 (rotating body shaft) at a bearing (not shown). As shown in FIG. 3A, when the process cartridge 1 is attached inside the printer, the photoreceptor shaft 172 supported by the rear plate 70 is inserted into the center hole of the photoreceptor 2 (rotating body). The cross-sectional shape of the center hole is noncircular and may be, for example, D-shaped or oval. The photoreceptor shaft 172 has the same cross-sectional shape as the center hole. This configuration prevents idle rotation of the photoreceptor shaft 172 in the center hole, thereby transmitting a drive force of the photoreceptor shaft 172 to the photoreceptor 2.

The photoreceptor shaft 172 extends through the rear plate 70 of the printer body such that the rear end of the photoreceptor shaft 172 is disposed at the rear side of the rear plate 70. A drive device 80 includes a bracket 82, a drive motor 81 (drive source), and a constant velocity joint 130 (drive force transmission unit) and is fixed to the surface of the rear plate 70 opposite to the surface facing the front plate 71. The drive motor 81 and the photoreceptor shaft 172 are linearly aligned so that a drive force of the drive motor 81 is transmitted to the photoreceptor shaft 172 via the constant velocity joint 130.

The drive motor 81 is a so-called direct drive motor that transmits a drive force to the photoreceptor 2 without using a gear. Transmitting a drive force from the output shaft 81*a* to the photoreceptor shaft 172 without using a gear prevents speed fluctuation of the photoreceptor 2 due to eccentricity of a gear or a gear pitch variation.

When removing the process cartridge 1 from the printer, the movable front plate 71 is moved from the position where the front plate 71 faces the rear plate 70. Then the process cartridge 1 is pulled out from the rear of the printer to the front. It is to be noted that the photoreceptor 2 is held by a frame 90 of the process cartridge 1.

Figure 4:
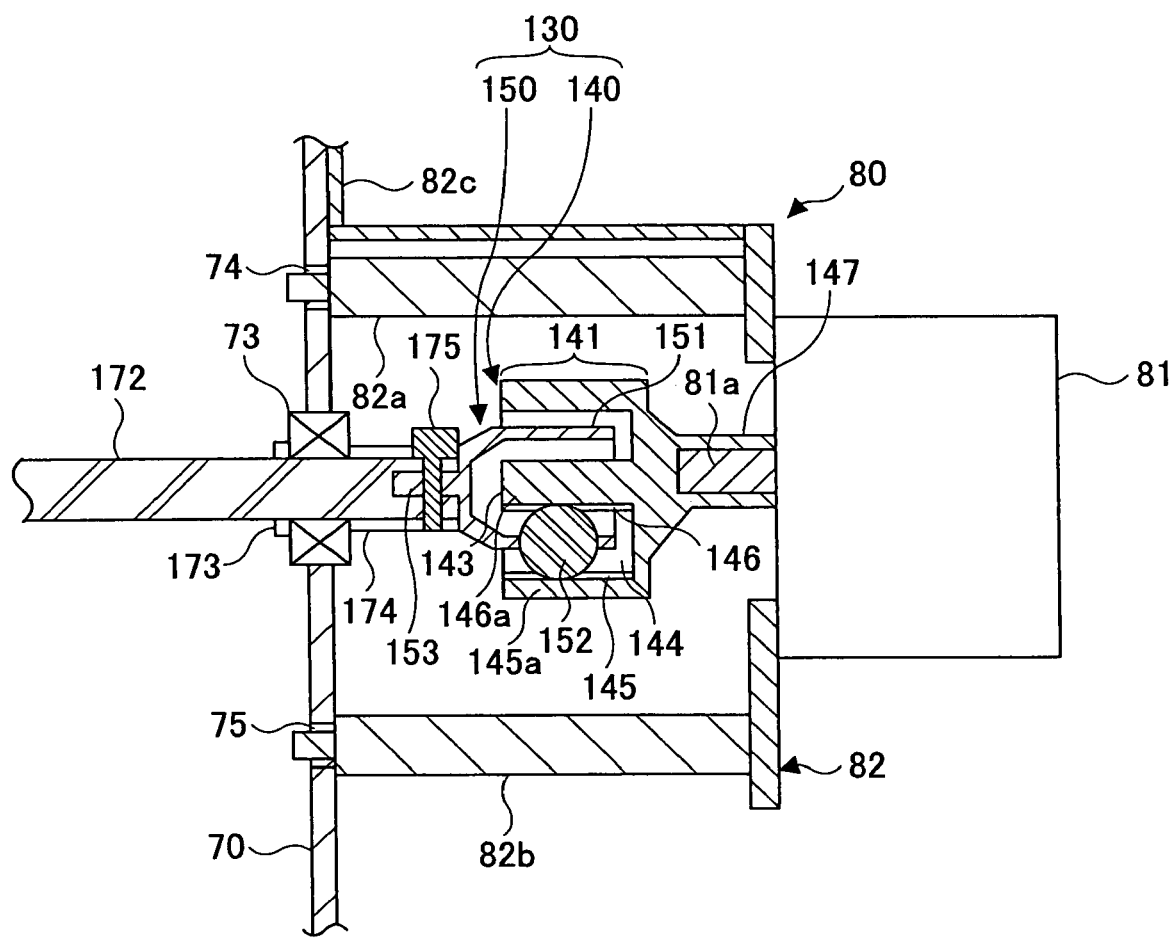
FIG. 4 is a schematic configuration diagram illustrating a drive device.

FIG. 4 is a schematic configuration diagram illustrating the drive device 80. In FIG. 4, to the left side of the rear plate 70 is a unit side where the process cartridge 1 (not shown) is disposed, while to the right side of the rear plate 70 is a drive force transmission side where the drive device 80 is disposed. The drive device 80 includes the bracket 82 fixed to the drive-force-transmission-side surface of the rear plate 70, the drive motor 81 fixed to the rear surface of the bracket 82, and the constant velocity joint 130 (drive force transmission unit) disposed inside the bracket 82.

The bracket 82 is formed by bending (e.g., by pressing) sheet metal. The bracket 82 includes two positioning pins 82*a* and 82*b* to be inserted into two positioning holes 74 and 75, respectively, in the rear plate 70 to position the bracket 82 on the rear plate 70. The bracket 82 further includes a fixing portion 82*c* for fixing the bracket 82 to the rear plate 70 by a screw. A screw hole (not shown) for fixing the bracket 82 to the rear plate 70 by a screw is provided in the fixing portion 82*c*.

The output shaft 81*a* of the drive motor 81, which drive motor 81 is fixed to the rear surface of the bracket 82, extends through a circular hole in the rear surface of the bracket 82, so that the front end of the output shaft 81*a* is located inside the bracket 82 while the motor body is located outside the bracket 82.

The photoreceptor shaft 172 (rotating body shaft) is press fitted in a bearing 73 fixed to the rear plate 70 and extends through the rear plate 70. A fixing ring 173 having a diameter greater than the diameter of the photoreceptor shaft 172 is fitted around the photoreceptor shaft 172 at its predetermined axial position. This fixing ring 173 hits the unit-side surface of the bearing 73, so that the photoreceptor shaft 172 is positioned in the axial direction relative to the apparatus body.

The constant velocity joint 130 connects, inside the bracket 82, the output shaft 81*a* and the photoreceptor shaft 172 that are axially aligned. As mentioned above, the bracket 82 is formed by bending sheet metal. Therefore, the bent angle formed by bending tends to vary, so that it is difficult to accurately position the drive motor 81 relative to the rear plate 70. Thus, the output shaft 81*a* of the drive motor 81 tends to be inclined with respect to the photoreceptor shaft 172. According to this printer, even if the output shaft 81*a* is skewed, because the output shaft 81*a* and the photoreceptor shaft 172 are connected with the constant velocity joint 130, it is possible to transmit a drive force from the output shaft 81*a* to the photoreceptor shaft 172 at a constant speed.

The constant velocity joint 130 is described below in greater detail with reference to FIGS. 4-10.

The constant velocity joint 130 includes an outer ring 140 and a cage 150. The photoreceptor shaft 172 is connected to the left axial end (as viewed in FIG. 4) of the cage 150. An output shaft 81*a* of the drive motor 81 is connected to the right axial end (as viewed in FIG. 4) of the outer ring 140.

The outer ring 140 includes a cup portion 141 having an open axial end for insertion of the cage 150. A shaft attachment portion 147 having a cylindrical shape is provided that extends from the other axial end of the cup portion 141 along the center axis of the cup portion 141. An inner boss portion 143 extending along the center axis of the cup portion 141 is provided inside the cup portion 141. An annular space 144 is formed between the cup portion 141 and the inner boss portion 143. The cup portion 141, the shaft attachment portion 147, and the inner boss portion 143 of the outer ring 140 are made of the same resin material and are molded integrally.

Figure 5:
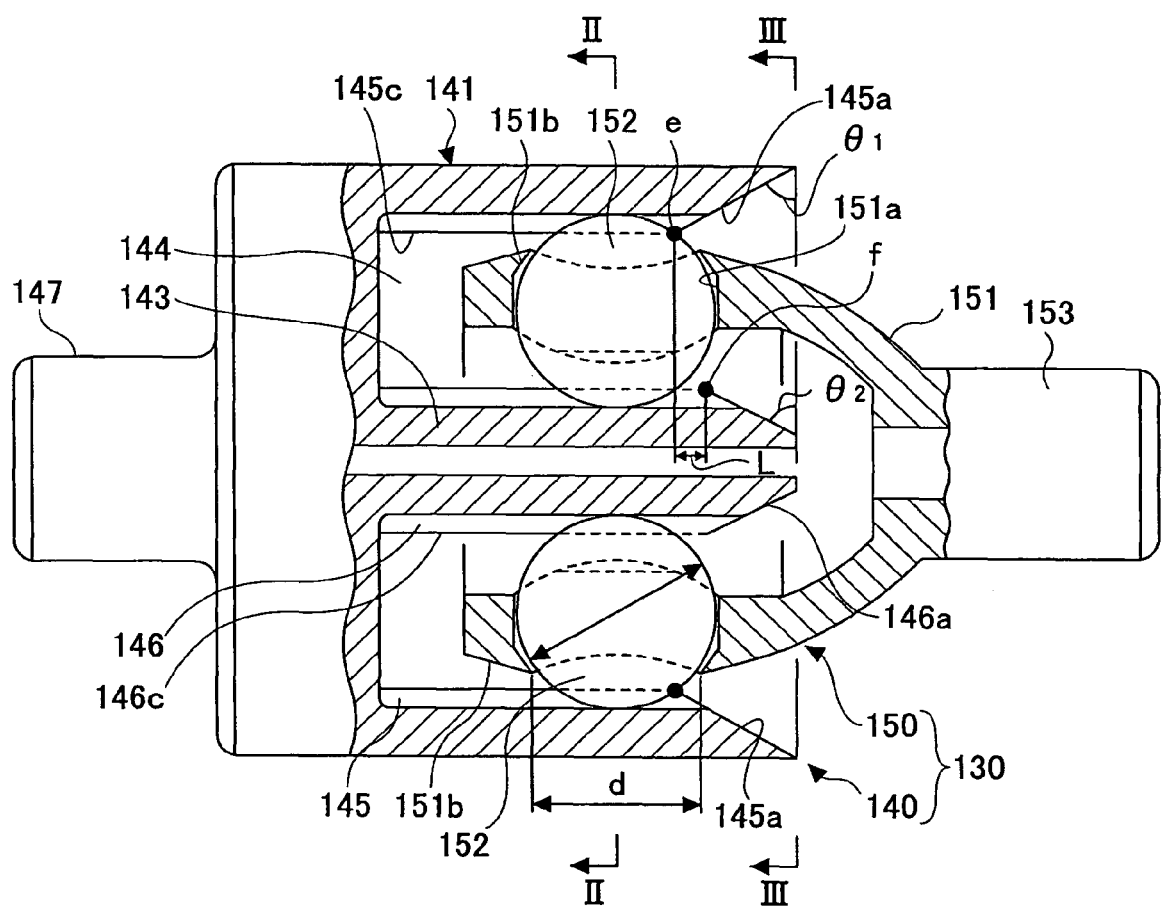
FIG. 5 is a cut-away side view illustrating a constant velocity joint.

The outer ring 140 includes three outer grooves (track grooves) 145 in the inner periphery of the cup portion 141 and three inner grooves (track grooves) 146 in the outer periphery of the inner boss portion 143. Referring to FIG. 5, the annular space 144 has an open axial end for insertion of the cage 150 and has a closed axial end opposite to the open axial end. The output shaft 81a is fitted and fixed inside the shaft attachment portion 147 having a cylindrical shape.

An outer wall tapered portion 145a is provided that extends from an open-side end point e of each outer groove 145. The deviation of the outer wall tapered portion 145a from the central axis of the outer ring 140 and the groove width of the outer wall tapered portion 145a increase toward the open end. An inner wall tapered portion 146a is provided that extends from an open-side end point f of each inner grove 146. The deviation from the central axis of the outer ring 140 decreases toward the open end while the groove width of the inner wall tapered portion 146a increases toward the open end.

As shown in FIG. 5, the open-side end point f of the inner groove 146 is closer to the open end by a distance L than the open-side end point e of the outer groove 145 is.

Figure 6:
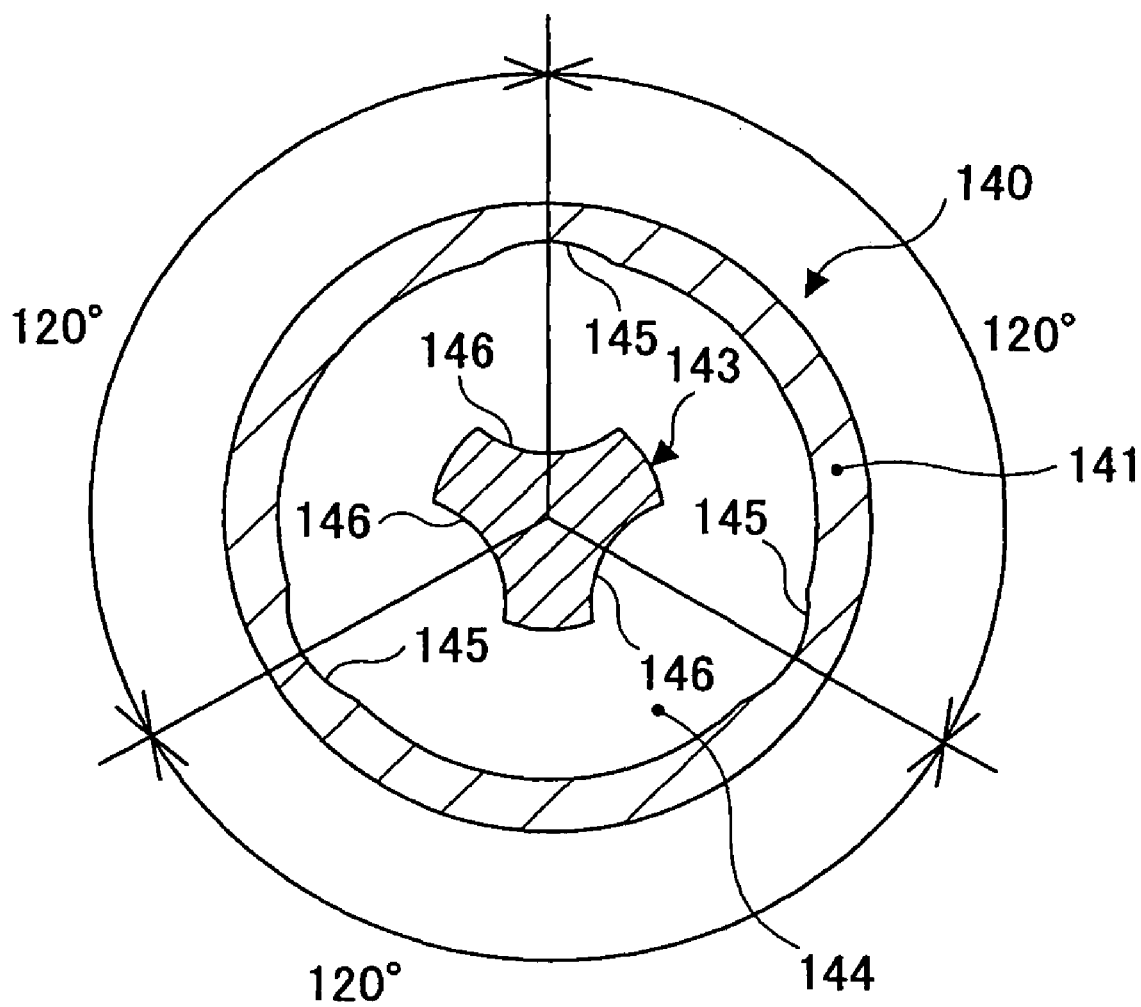
FIG. 6 is a cut-away side view illustrating a cup portion of an outer ring.

Referring to FIG. 6, the three outer grooves 145 formed in the inner periphery of the cup portion 141 extend in the axial direction of the cup portion 141 and are circumferentially aligned with a 120° phase difference (angular difference) relative to one another. Similarly, the three inner grooves 146 formed in the outer periphery of the inner boss portion 143 extend in the axial direction of the inner boss portion 143 and are circumferentially aligned with a 120° phase difference relative to one another. The outer grooves 145 face the inner grooves 146 over the annular space 144.

Figure 7:
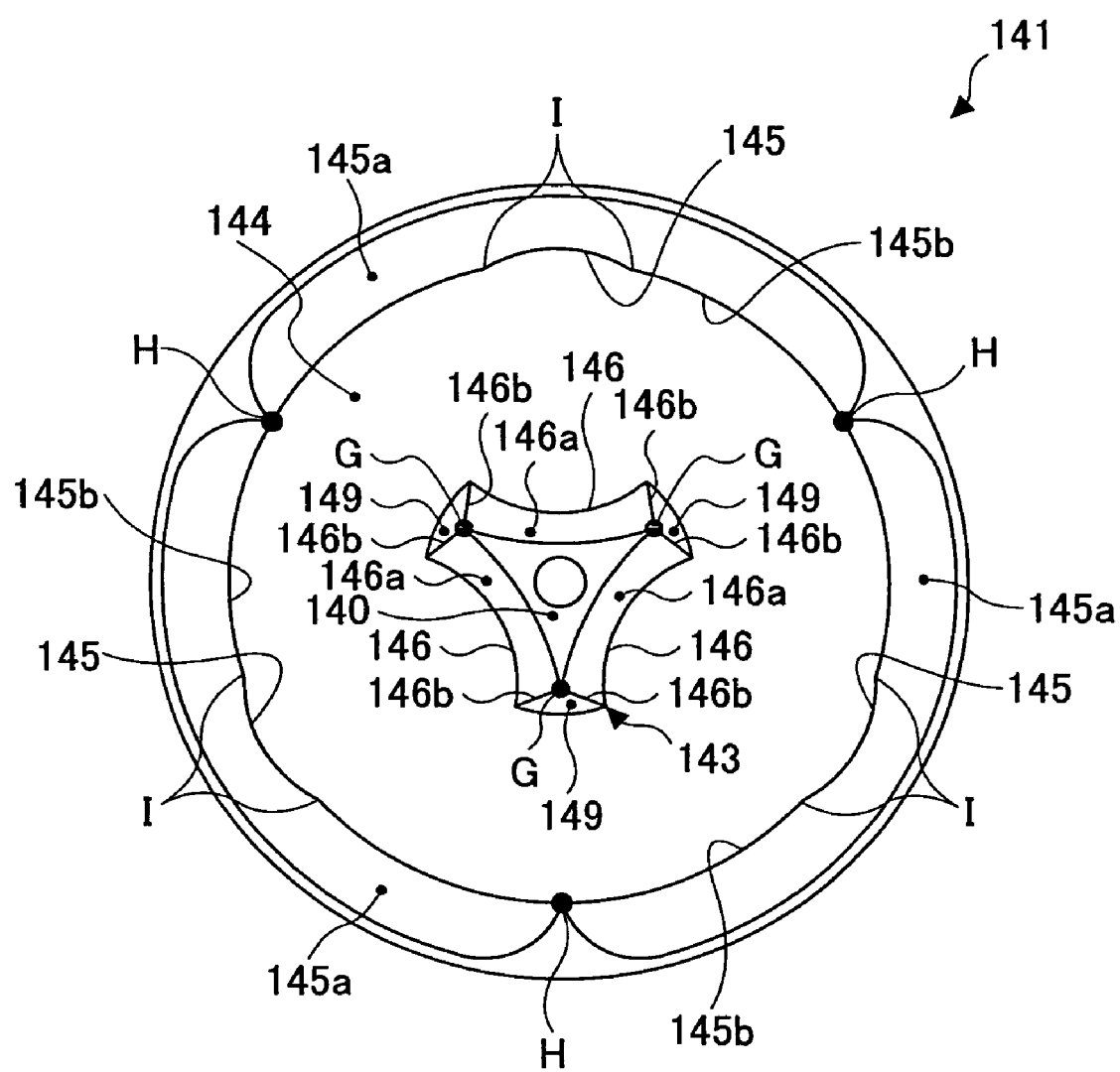
FIG. 7 is a cut-away side view illustrating the cup portion of the outer ring.
Figure 8:
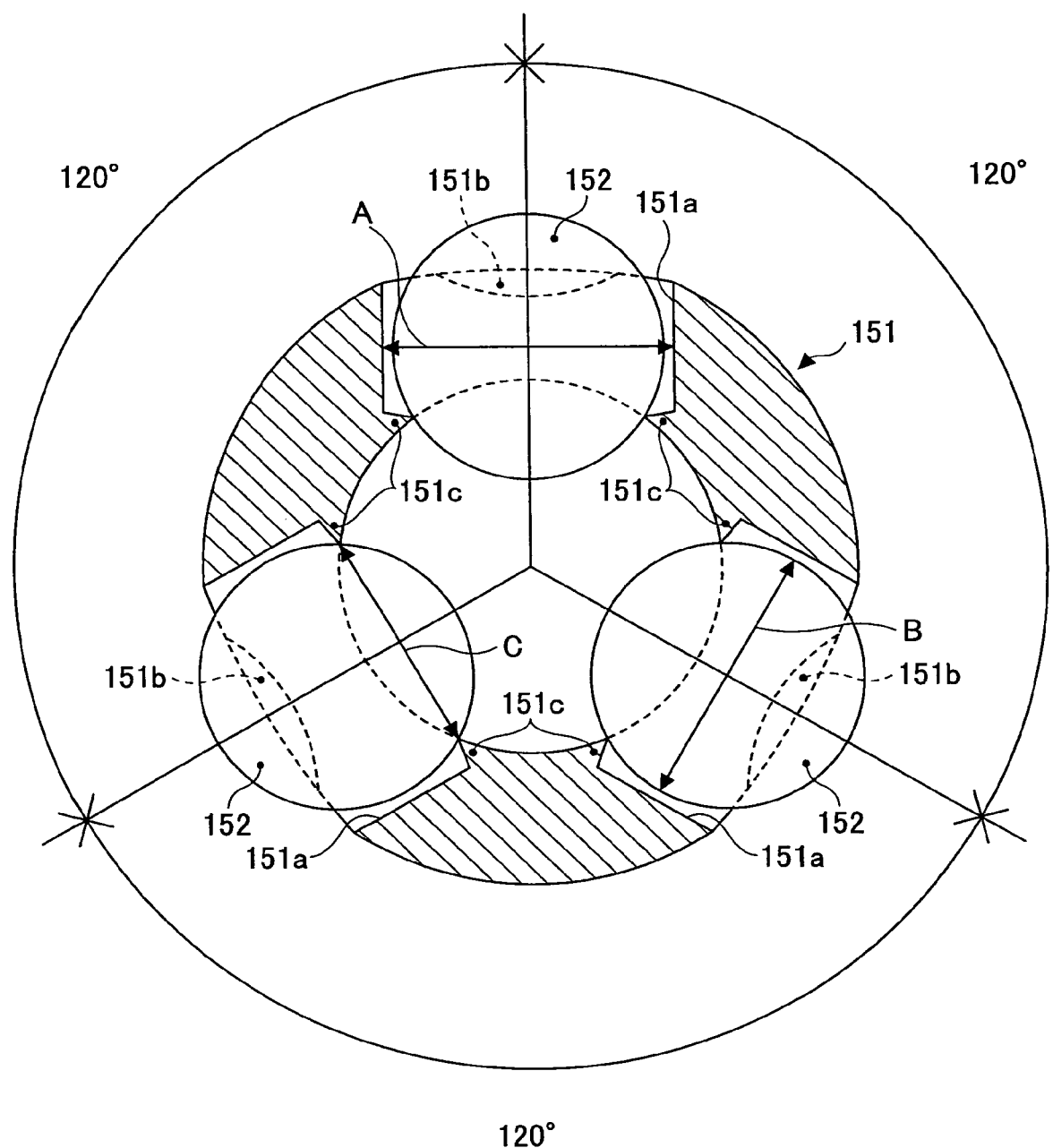
FIG. 8 is a cut-away side view illustrating a ball holding portion of a cage.

As shown in FIG. 7, circumferential edges 145b of the adjacent outer wall tapered portions 145a intersect at the open end of the cup portion 141 (to form intersections H). Circumferential edges 146b of the adjacent inner wall tapered portions 146a intersect at the open end of the cup portion 141 (to form intersections G).

The cage 150 includes a cylindrical insertion portion 151 at the front end. Referring to the cut-away side view shown in FIG. 8, the insertion portion 151 includes three through holes 151a (ball holding portions) and rotatably holds balls 152 (spherical bodies) in the through holes 151a. The through holes 151a are formed in a cylindrical peripheral wall and are circumferentially aligned with a 120° phase difference relative to one another.

A diameter A of the through holes 151a is greater than a diameter B of the balls 152. Inner peripheral retaining projections 151c (see FIG. 8), each projecting from the inner surface at the inner peripheral end of the corresponding through hole 151a, are disposed with a 180° phase difference relative to one another. Outer peripheral retaining projections 151b, each projecting from the inner surface at the outer peripheral end of the through hole 151a, are disposed with a 180° phase difference relative to one another. The outer peripheral retaining projections 151b are disposed with a 90° phase difference relative to the inner peripheral retaining projections 151c. Each outer peripheral retaining projection 151b prevents the ball 152 in the through hole 151a from coming out from the outer periphery of the insertion portion 151. Each inner peripheral retaining projection 151c prevents the ball 152 in the through hole 151a from coming out from the inner periphery of the insertion portion 151. The diameter of the inscribed circle of the opposing retaining projections 151b and 151c may preferably be in the range of 80-99% of the diameter of the ball 152. If the diameter of the inscribed circle is less than 80%, the retaining projections 151b and 151c extend excessively inside the through hole 151a to prevent insertion of the ball 152 into the through hole 151a. The retaining projections 151b and 151c are forcibly removed from the mold when they are formed. If the retaining projections 151b and 151c extend excessively inside the through hole 151a, the retaining projections 151b and 151c might be broken upon removal from the mold. For these reasons, the diameter of the inscribed circle of the opposing retaining projections 151b and 151c may preferably be greater than 80% of the diameter of the ball 152.

Because the diameter A of the through hole 151a is greater than the diameter B of the ball 152, the ball 152 can move radially inside the through hole 151a. Therefore, during insertion of the insertion portion 151 of the cage 150 into the annular space 144 of the outer ring 140, when the ball 152 hits the cup portion 141 of the outer ring 140, the ball 152 moves toward the central axis of the cage 150. This allows smooth insertion of the insertion portion 151 of the cage 150 into the annular space 144 of the outer ring 140.

When the cylindrical insertion portion 151 of the cage 150 is inserted in the annular space 144 in the cup portion 141 of the outer ring 140 as shown in FIG. 5, the three balls 152 in the through holes 151a are disposed between the corresponding outer grooves 145 and inner grooves 146 formed in the inner periphery of the cup portion 141 of the outer ring 140 and the outer periphery of the inner boss portion 143, respectively, and therefore cannot move in the normal line direction. However, because the outer grooves 145 and the inner grooves 146 extend in the axial direction, the balls 152 can move in the axial direction.

Figure 9:
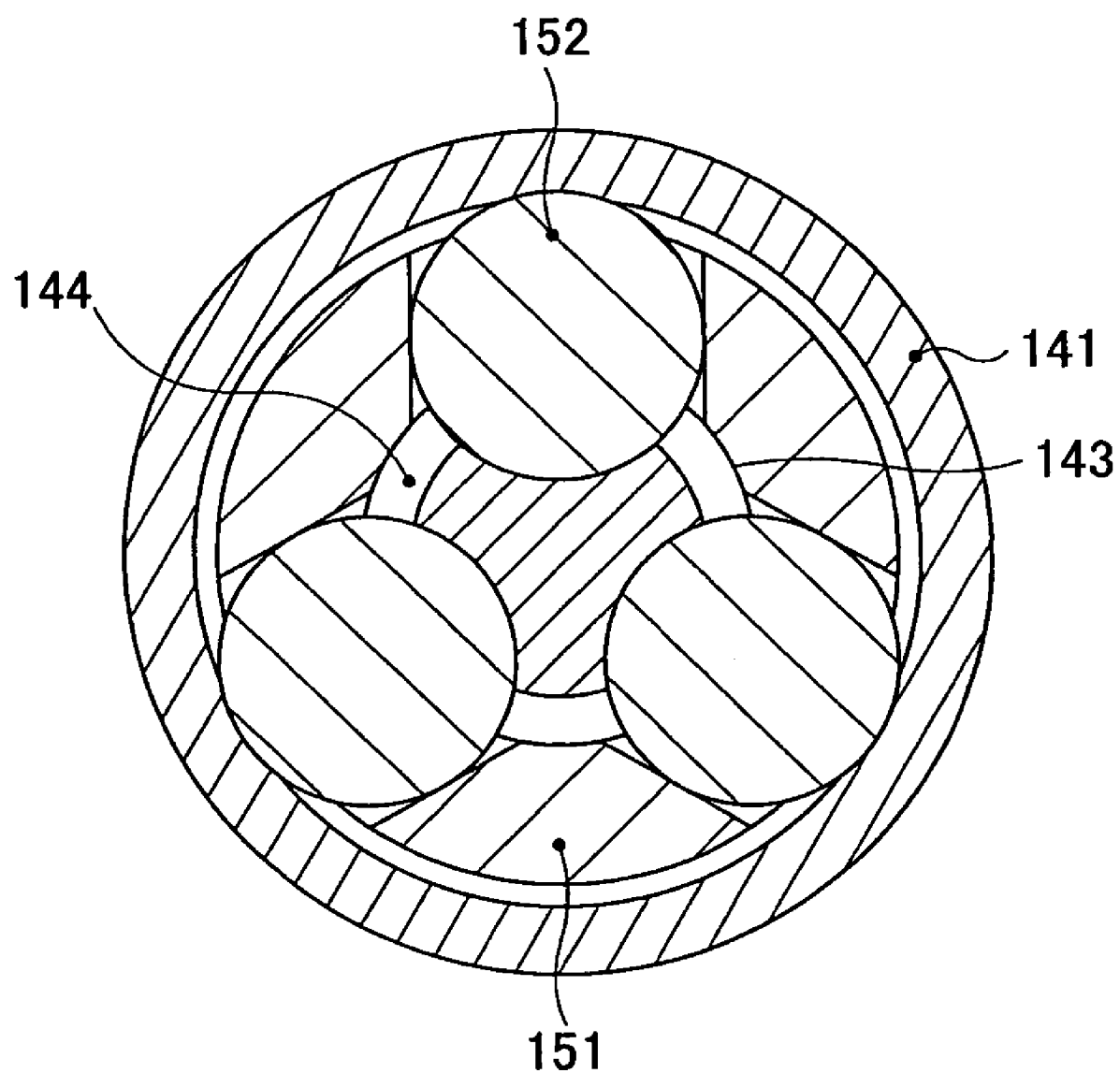
FIG. 9 is a cross-sectional view taken along line II-II of FIG. 5.

When the cylindrical insertion portion 151 of the cage 150 is inserted into the annular space 144 in the cup portion 141 of the outer ring 140 as shown in FIG. 9, the three balls 152 held by the insertion portion 151 of the cage 150 are engaged in the annular space 144 by the corresponding outer grooves 145 and inner grooves 146. Then, when the outer ring 140 rotates together with the output shaft 81a of the drive motor 81 (FIG. 4), the drive force is transmitted to the cage 150 via the three balls 152 at a constant speed. Thus, the photoreceptor shaft 172 and a photoreceptor (not show) rotate at a constant speed.

The resin material of the integrally molded cup portion 141, the shaft attachment portion 147, and the inner boss portion 143 of FIG. 5 is an injection-moldable synthetic resin. The injection-moldable synthetic resin may be thermoplastic resin or thermosetting resin. The injection-moldable synthetic resin includes crystalline resin and non-crystalline resin. Although either one of crystalline resin and non-crystalline resin may be used, because non-crystalline resin has lower toughness and is suddenly broken in response to application of torque greater than the acceptable level of torque, crystalline resin is more preferable. The injection-moldable synthetic resin used herein preferably has high lubrication properties. Examples of such synthetic resin include polyacetal (POM), nylon, injection-moldable fluorine resin (e.g., PFA, FEP, and ETFE), injection-moldable polyimide, polyphenylene sulfide (PPS), wholly aromatic polyester, polyetheretherketone (PEEK), and polyamideimide. These synthetic resins may be used alone or as a mixture of two or more of them as a polymer alloy. Synthetic resins having relatively low lubrication properties may also be used as a polymer alloy containing one or more of the above synthetic resins.

The most preferable synthetic resin of the cup portion 141, etc., include POM, nylon, PPS, and PEEK. Examples of nylon include nylon 6, nylon 66, nylon 610, nylon 612, nylon 11, nylon 12, nylon 46, and semiaromatic nylon having an aromatic ring in its molecular chain. Among these, POM, nylon and PPS provide good heat resistance and lubricating properties and are relatively inexpensive, and therefore using them can reduce the cost of the constant velocity joint 130. PEEK provides good mechanical strength and lubricating properties without containing reinforcement and lubricant, and therefore using PEEK can improve the performance of the constant velocity joint 130.

According to the above-described constant velocity joint 130, because the cup portion 141 is made of a resin material, the outer ring 140 has less weight than a related-art cup portion made of a metal material. Further, because the inner periphery of the cup portion 141 is made of a resin material, it is possible to smoothly rotate the outer ring 140 and the cage 150 relative to each other without applying grease to the annular space 144 and to reduce noise compared to the related-art cup portion made of a metal material. As a result, it is possible to reduce the weight of the constant velocity joint 130 of this printer, reduce the operating noise during torque transmission, and eliminate a need for applying grease. Therefore, the constant velocity joint 130 is free from restrictions on noise and grease contamination and can be used in machines, such as office equipment, audio equipment, medical equipment, consumer electronics, and food producing machines, for which a related art constant velocity joint is not suitable.

The sliding properties may be improved by adding solid a solid lubricant or a lubricating oil to the resin material of the cup portion 141, etc. Examples of a solid lubricant include PTFE, black lead, and molybdenum disulfide. Glass fiber, carbon fiber, various types of mineral fiber (whiskers) may be mixed with the resin material to improve the strength. A solid lubricant or the like may be used together.

The balls 152 may include bearing steel, stainless balls, ceramics balls, and balls of synthetic resin. Among these, the stainless balls are preferable because the stainless balls do not develop rust and are inexpensive.

According to the printer of this embodiment, not only the outer ring 140 but also the cage 150 is made of a resin material. The preferable resin material for the cage 150 is the same as the preferable material for the outer ring 140. The cage 150 made of a resin material realizes a further reduction in the weight.

According to this printer, as shown in FIG. 3B, the photoreceptor 2 that rotates together with the photoreceptor shaft 172 (rotating body shaft) is used as a latent image carrier. The photoreceptor shaft 172 is connected to the constant velocity joint 130. Therefore, as mentioned above, even if the output shaft 81a of the drive motor 81 is skewed relative to the photoreceptor shaft 172 due to a variation in the accuracy in bending the bracket 82, a drive force can be transmitted to the photoreceptor 2 at a constant speed. Further, as show in FIGS. 3A and 3B, the photoreceptor shaft 172 extends through and engages the center hole of the photoreceptor 2 that axially extends through the photoreceptor 2. This configuration allows the photoreceptor 2 and the process cartridge 1 to be removed from the apparatus body while the photoreceptor shaft 172 is fixed to the apparatus body.

Referring again to FIG. 4, the outer ring 140 includes the shaft attachment portion 147 having a cylindrical shape and projecting axially from one axial end of the cup portion 141. The output shaft 81a of the drive motor 81 is fitted in the hollow space of a shaft portion 153. Thus the outer ring 140 is axially connected to the output shaft 81a.

The photoreceptor shaft 172 has a hollow structure at an end, into which hollow structure the shaft portion 153 of the cage 150 is inserted so that the photoreceptor shaft 172 is connected to the cage 150. A thrust holding member 174 is fitted around the end portion of the photoreceptor shaft 172. In this way, the thrust holding member 174, the photoreceptor shaft 172, and the shaft portion 153 overlap each other at the end of the photoreceptor shaft 172. Each of the photoreceptor shaft 172 and the shaft portion 153 has a through hole (not shown) extending in the direction orthogonal to the axial direction. Further, the hollow thrust holding member 174 has a through hole (not shown) extending in the direction orthogonal to the axial direction at a part of the peripheral surface. The hollow thrust holding member 174 also has a screw hole facing the through hole over the hollow space. Theses through holes and the screw holes are linearly arranged so that a screw 175 is inserted into the through holes of the thrust holding member 174, the photoreceptor shaft 172, and the shaft portion 153. Thus the screw 175 is threaded into the screw hole of the thrust holding member 174. In this way, the cage 150 is fixed to the photoreceptor shaft 172.

The thrust holding member 174 having a cylindrical shape is tightly fitted between the insertion portion 151 and the bearing 73 as shown in FIG. 4. This prevents the photoreceptor shaft 172 from coming out of the bearing 73. In this way, according to this printer, the photoreceptor shaft 172 is inserted into the thrust holding member 174 having a diameter greater than the diameter of the photoreceptor shaft 172, and the thrust holding member 174 is disposed between the cage 150 and the bearing 73. Thus, it is possible to prevent the photoreceptor shaft 172 from coming out of the bearing 73.

The following describes how the photoreceptor shaft 172 is connected to the output shaft 81a.

Referring to FIG. 4, the photoreceptor shaft 172 is fitted from the side of the process cartridge 1 (not shown) into the bearing 73 fixed to the rear plate 70 of the printer body. The fixing ring 173 is caused to hit the process-cartridge-side surface of the bearing 73, so that the photoreceptor shaft 172 is positioned in the axial direction relative to the printer body. Then the thrust holding member 174 is fitted around the end portion of the photoreceptor shaft 172 extending through the rear plate 70 toward the drive device 80. The shaft portion 153 of the cage 150 is inserted into the hollow portion. Then the cage 150 and the thrust holding member 174 are fixed to the photoreceptor shaft 172 by the screw 175.

Figure 10:
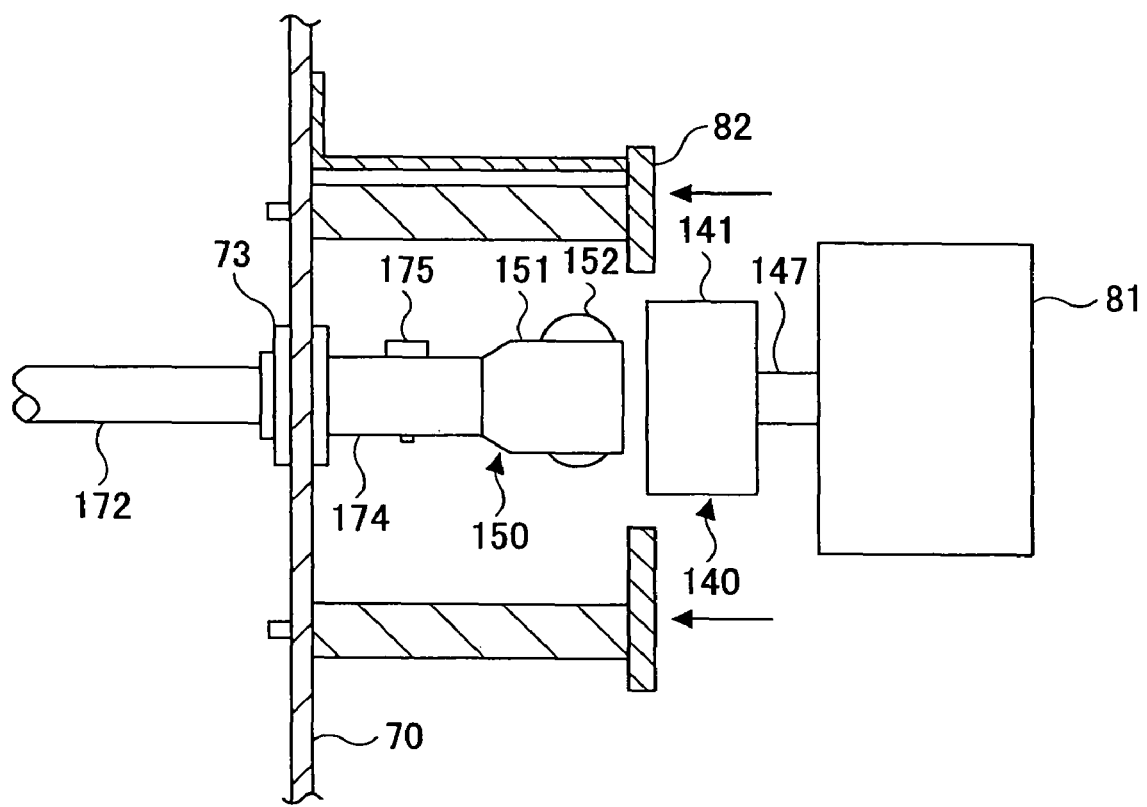
FIG. 10 is a cut-away side view illustrating how a cup portion is engaged by an insertion portion and fixed to a bracket.

After attaching the photoreceptor shaft 172 to the apparatus body as described above, the output shaft 81a of the drive motor 81 and the outer ring 140 attached to the output shaft 81a are inserted into the circular hole formed in the rear surface of the bracket 82 as shown in FIG. 10. Then the insertion portion 151 of the cage 150 attached to the photoreceptor shaft 172 is inserted into the cup portion 141 of the outer ring 140 to cause the outer ring 140 to engage the cage 150. In this step, if there is a phase difference between the balls 152 and the track grooves (the inner grooves 146 and the outer grooves 145), the balls 152 are guided by the inner wall tapered portions 146a and the outer wall tapered portions 145a, and the cage 150 or the outer ring 140 is rotated by insertion of the drive motor 81. Thus the phase of the balls 152 matches the phase of the track grooves (the inner grooves 146 and the outer grooves 145). When the phase of the balls 152 matches the phase of the track grooves (the inner grooves 146 and the outer grooves 145), the insertion portion 151 of the cage 150 is inserted into the annular space 144 of the outer ring 140, so that the three balls 152 held by the insertion portion 151 of the cage 150 engage the annular space 144 by the corresponding outer grooves 145 and inner grooves 146. After the cage 150 engages the outer ring 140 in this way, the drive motor 81 is fixed to the bracket by a screw.

According to the constant velocity joint 130, as shown in FIG. 5, the open-side end point f of the inner groove 146 is closer to the open end by the distance L than the open-side end point e of the outer groove 145 is. Therefore, the ball 152 engages first the inner groove 146 and then the outer groove 145. Therefore, when the ball 152 engages the outer groove 145, the phase of the ball 152 is already matched with the phase of the outer groove 145, and the ball 152 does not become lodged at the junction I (see FIG. 7) of the axial edge 145b of the outer wall tapered portion 145a and an edge 145c of the outer groove 145. This reduces the insertion resistance of the ball 152 held by the cage 150 into the annular space 144 between the outer groove 145 and the inner groove 146 of the outer ring 140, thereby allowing easy engagement of the cage 150 and the outer ring 140.

Figure 11:
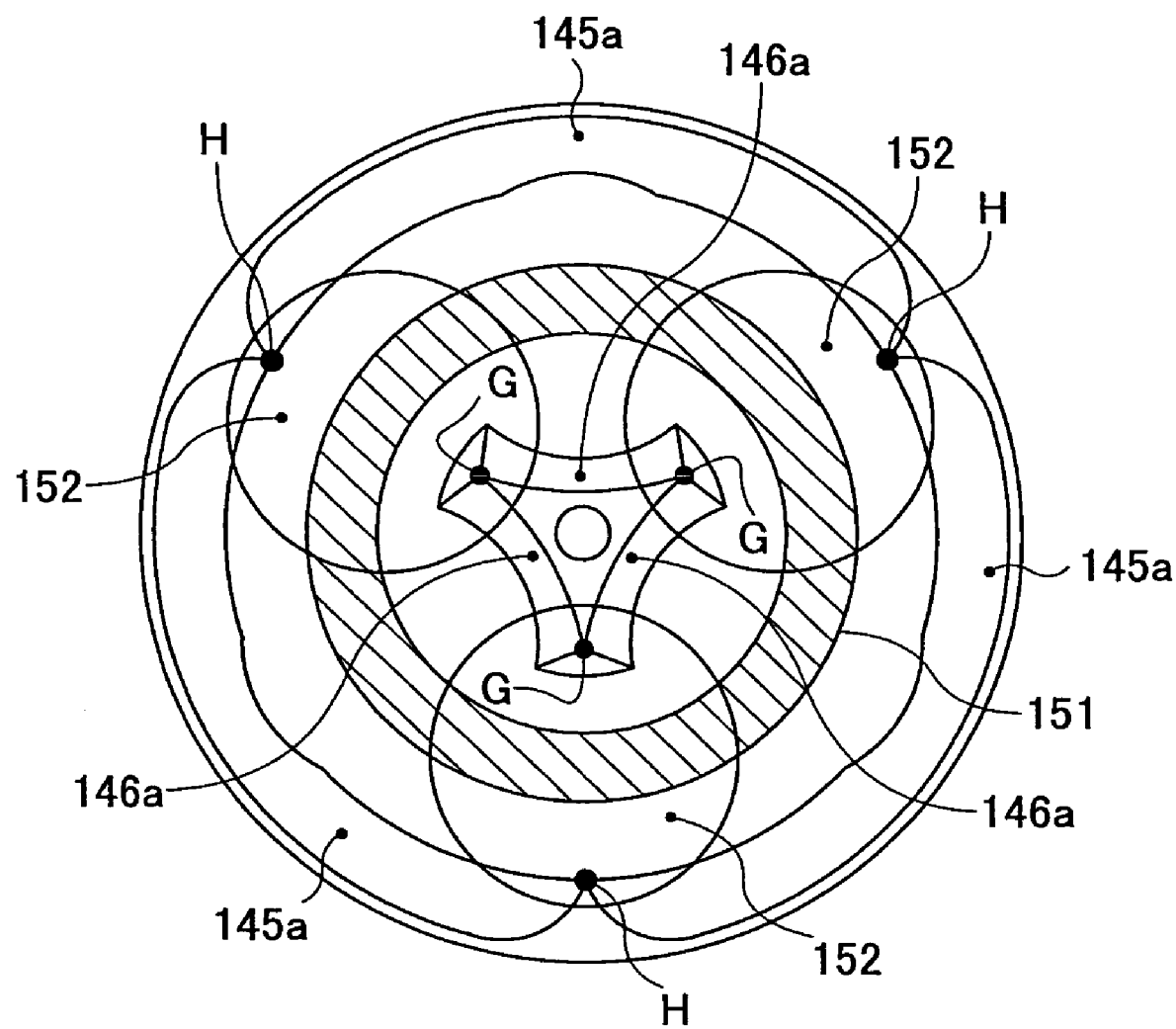
FIG. 11 is a diagram illustrating how an outer ring engages a cage when a ball and track grooves have an about 60° phase difference.

According to the constant velocity joint 130, as shown in FIG. 7, the outer wall tapered portions 145a are formed such that the circumferential edges 145b of the adjacent outer wall tapered portions 145a intersect each other. The inner wall tapered portions 146a are formed such that the circumferential edges 146b of the adjacent inner wall tapered portions 146a intersect each other at the open end of the cup portion 141. If the cage 150 is caused to engage the outer ring 140 with an about 60° phase difference between the ball 152 and the track grooves (the outer groove 145 and the inner groove 146) as shown in FIG. 11, the ball 152 comes into contact with the intersection G of the circumferential edges 146b of the adjacent inner wall tapered portions 146a at the open ends of inner wall tapered portions 146a. When the cage 150 is moved from the position of FIG. 11 to cause the ball 152 to engage the inner groove 146 and the outer groove 145, an axial force is applied to both the intersection G and the intersection H. Part of the axial force applied to the intersection G and H is converted into a rotational force, so that the outer ring 140 rotates clockwise or counterclockwise as viewed in FIG. 11. In this way, according to the constant velocity joint 130 of this embodiment, the inner wall tapered portions 146a are formed such that the circumferential edges 146b of the adjacent inner wall tapered portions 146a intersect at the open end, and therefore part of the axial force applied to the inner boss portion 143 can be converted into rotational force. It is therefore possible to smoothly rotate the outer ring 140 relative to the cage 150 compared to the constant velocity joint of Patent Document 2 in which the circumferential edges of the adjacent inner wall tapered portions do not intersect at the open end. Accordingly, it is possible to reduce the insertion resistance of the ball 152 held by the cage 150 into the annular space 144 between the outer groove 145 and the inner groove 146 of the outer ring 140, thereby allowing easy engagement of the cage 150 and the outer ring 140.

Side faces 149 (see FIG. 7) between adjacent inner wall tapered portions 146 may be tapered such that the diameter of the annular space 144 increases toward the open end. This configuration increases the thickness of regions around the points G of the open end of the inner boss portion 143. Therefore, it is possible to prevent the open end of the inner boss portion 143 from being broken upon the balls 152 hitting the regions around the points G of the inner boss portion 143.

As shown in FIG. 5, an inclination angle θ1 of the outer wall tapered portion 145a relative to the opening surface of the annular space 144 may be made greater than an inclination angle θ2 of the inner wall tapered portion 146a relative to the opening surface of the annular space 144. With this configuration, the ball 152 is guided by only the inner wall tapered portion 146a when the cage 150 is engaged into the outer ring 140 coaxially aligned with the cage 150. The groove width of the outer wall tapered portion 145a increases toward the open end more greatly than the inner wall tapered portion 146a does. Therefore, the curve of the outer wall tapered portion 145a is smaller than the curve of the inner wall tapered portion 146a. Accordingly, in the outer wall tapered portion 145a, the force that rotates the outer ring 140 relative to the cage 150 during movement of the cage 150 into the outer ring 140 is smaller than in the inner wall tapered portion 146a.

The force that rotates the outer ring 140 relative to the cage 150 is greater in the case where the ball 152 is brought into contact with only the inner wall tapered portion 146a to focus the force that moves the cage 150 onto the inner wall tapered portion 146a than in the case where the ball 152 is brought into contact with both the outer wall tapered portion 145a and the inner wall tapered portion 146a to distribute the force that moves the cage 150 into the outer ring 140 into the outer wall tapered portion 145a and the inner wall tapered portion 146a. As a result, the outer ring 140 can be smoothly rotated relative to the cage 150. Accordingly, it is possible to reduce the insertion resistance of the ball 152 held by the cage 150 into the annular space 144 between the outer groove 145 and the inner groove 146 of the outer ring 140, thereby allowing easy engagement of the cage 150 and the outer ring 140.

The open end of the inner boss portion 143 may extend more toward the cage 150 than the open end of the cup portion 141 does. With this configuration, the ball 152 can be guided by only the inner wall tapered portion 146a upon insertion of the ball 152 into annular space 144 of the outer ring 140.

Figure 12:
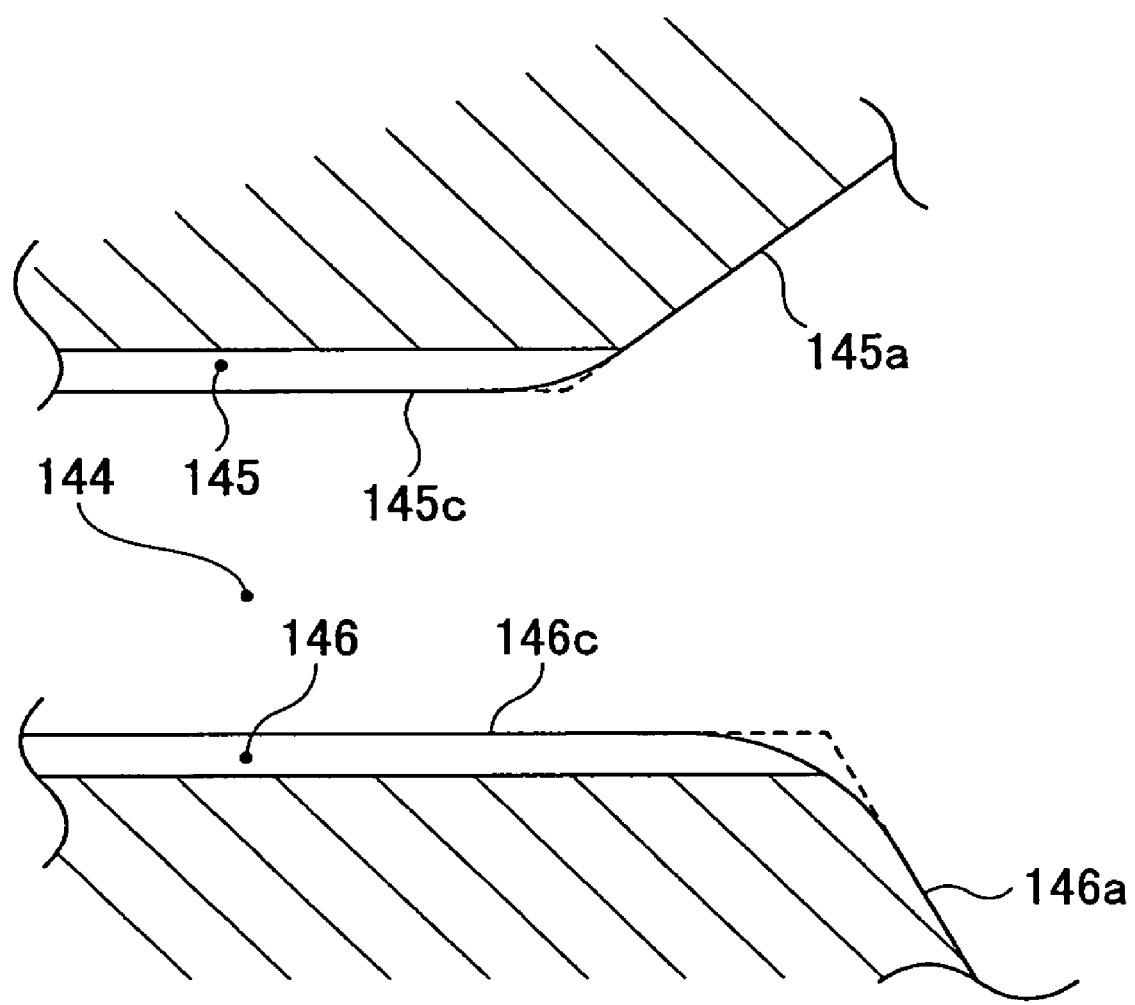
FIG. 12 is a cut-away side view illustrating a junction between an inner groove and an inner wall tapered face.

As shown in FIG. 12, the junction of the inner groove 146 and the inner wall tapered portion 146a may have an arcuate shape in the axial cross section of the constant velocity joint 130. According to this configuration, the risk of the ball 152 becoming lodged at the junction of the inner groove 146 and the inner wall tapered portion 146a upon engagement of the ball 152 and the inner groove 146 is lower than in the case where the junction of the inner groove 146 and the inner wall tapered portion 146a has an angular shape indicated by the dotted line in FIG. 12. Thus it is possible to smoothly engage the ball 152 in the inner groove 146. Further, as shown in FIG. 12, the junction of the outer groove 145 and the outer wall tapered portion 145a may have an arcuate shape to allow smooth engagement of the ball 152 and the outer groove 145.

Figure 13:
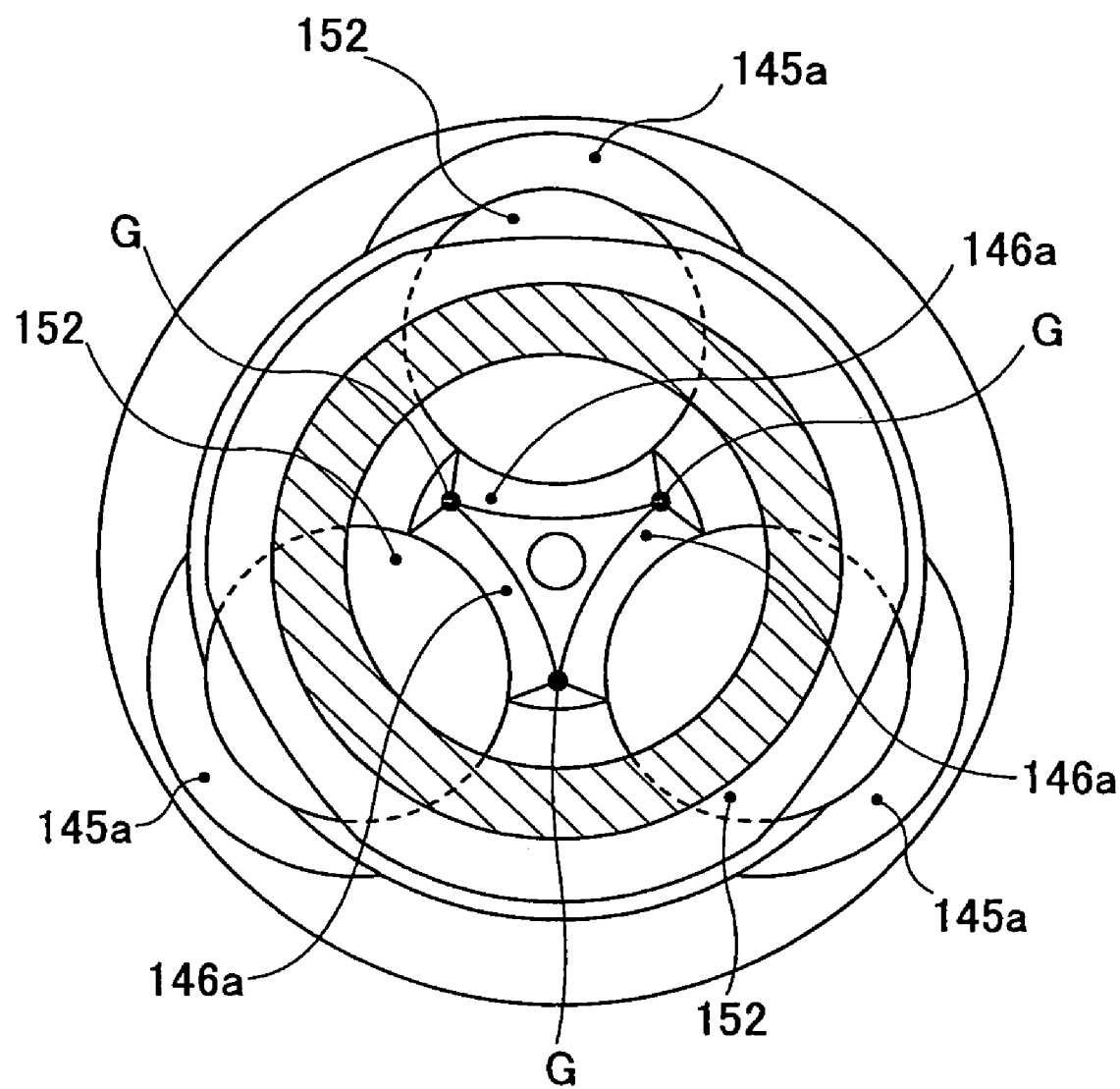
FIG. 13 is a schematic diagram illustrating a constant velocity joint according to another embodiment.

As shown in FIG. 13, the outer wall tapered portion 145a may be formed such that the diameter having its center at the center of the ball 152 in an engagement position with the grooves increases from the open-side end point e of the outer groove 145 toward the open end. In this case, if there is a phase difference of about 60° between the ball 152 and the grooves, the ball 152 does not come into contact with the outer wall tapered portion 145a. Thus it is not possible to convert part of the axial force applied to the open end of the cup portion 141 into a rotational force, so that the insertion resistance might be increased. To avoid this problem, in the case of the configuration of FIG. 13, the open end of the inner boss portion 143 may be disposed closer to the cage side than the open end of the cup portion 141 is. Then it is possible to bring the ball 152 into contact with the inner wall tapered portion 146a first upon insertion of the ball 152 into the annular space 144 of the outer ring 140. Thus the force that moves the cage 150 axially is applied only to the inner wall tapered portion 146a, so that the rotational force resulting from conversion by the inner wall tapered portion 146a is made greater than in the case where the ball 152 is brought into contact with both a non-tapered portion of the open end of the cup portion 141 and the intersection G of the circumferential edges b of the adjacent inner wall tapered portion 146a. Therefore, the outer ring 140 can be more smoothly rotated than in the case where the ball 152 is brought into contact with both the non-tapered portion of the open end of the cup portion 141 and the intersection G of the circumferential edges b of the adjacent inner wall tapered portion 146a, thereby reducing the insertion resistance.

Although either one of the outer ring 140 and the cage 150 may be attached to the output shaft 81a, the outer ring 140 is preferably attached to the output shaft 81a as shown in FIG. 4. The balls 152 slide more on the outer ring 140 than on the cage 150, and therefore the outer ring 140 wears faster than the cage 150 and reaches the end of its service life sooner. In the case where the outer ring 140 is attached to the photoreceptor shaft 172, when replacing the outer ring 140, the bracket 82 is removed from the rear plate 70, and then the outer ring 140 is removed from the photoreceptor shaft 172 supported by the rear plate 70 and disposed inside the apparatus body. In this way, if the outer ring 140 is attached to the photoreceptor shaft 172, the outer ring 140 is removed from the apparatus body, resulting in making replacement work difficult. On the other hand, in the case where the outer ring 140 is attached to the output shaft 81a, when replacing the outer ring 140, the drive motor 81 is removed from the bracket 82, and then the outer ring 140 is removed from the apparatus body for replacement. In this way, if the outer ring 140 is attached to the output shaft 81a, the outer ring 140 can be replaced outside the apparatus body, resulting in making the replacement work easier. That is, the replacement work is easier in the case where the outer ring 140 is attached to the output shaft 81a than in the case where the outer ring 140 is attached to the photoreceptor shaft 172. Thus, maintenance is easier in the case where the outer ring 140, which has a shorter service life than the service life of the cage 150, is attached to the output shaft 81a than in the case where the cage 150 is attached to the output shaft 81a.

Figure 14:
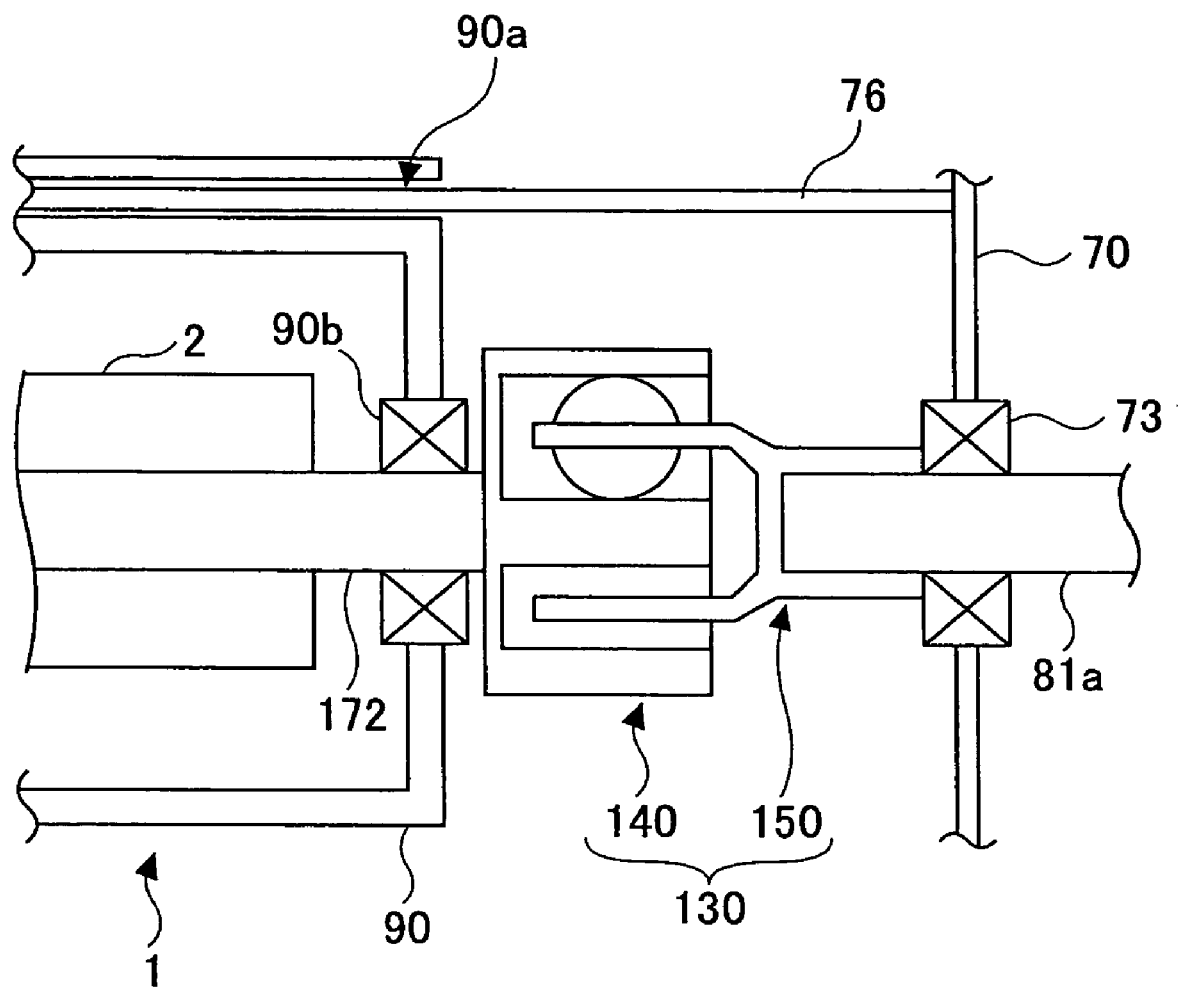
FIG. 14 is a schematic diagram illustrating an embodiment in which a constant velocity joint is used to connect a drive device and a process cartridge.

In an alternative embodiment, as shown in FIG. 14, the outer ring 140 is attached to the photoreceptor shaft 172 that is removed from the apparatus body together with the process cartridge 1, which is a unit removable from the apparatus body. The cage 150 is attached to the output shaft 81a of the drive motor 81. Thus the outer ring 140 is caused to engage the cage 150 by attaching the process cartridge 1 to the apparatus body.

Figure 15A:
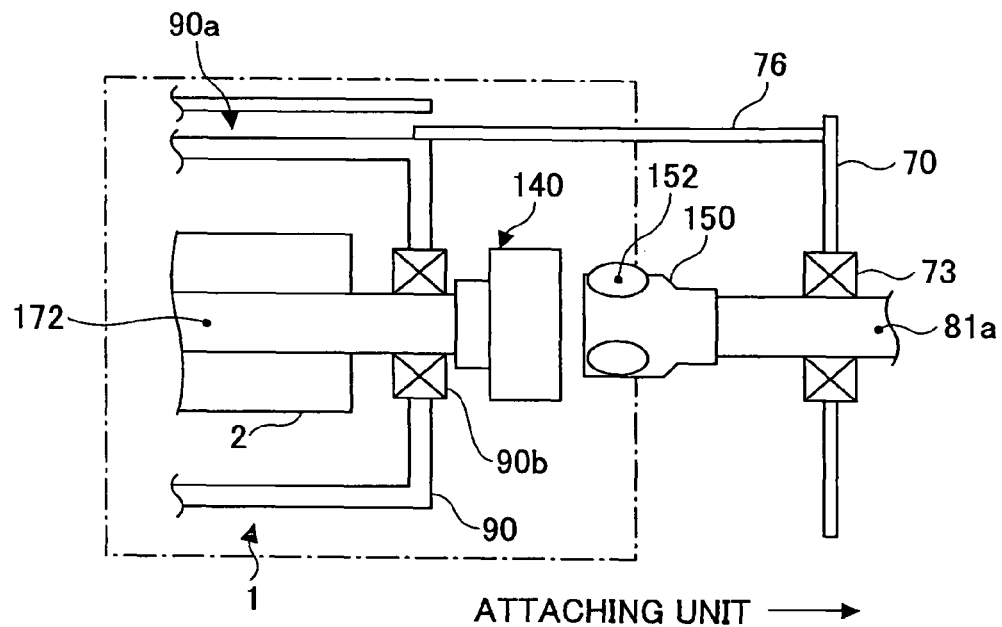
FIG. 15A is a schematic configuration diagram illustrating the vicinity of a constant velocity joint wherein a process cartridge is not attached to a printer body.
Figure 15B:
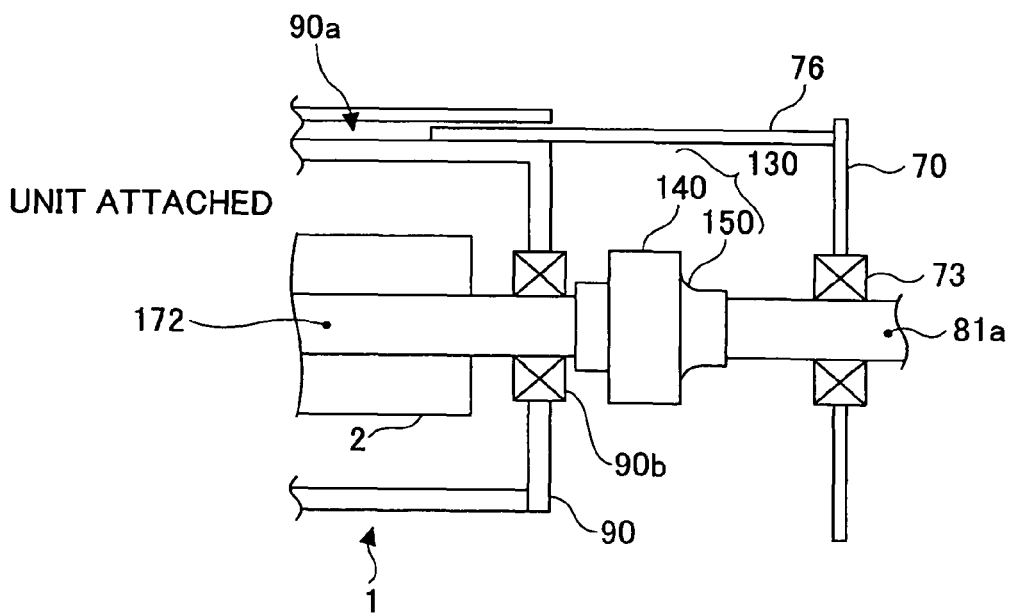
FIG. 15B is a schematic configuration diagram illustrating the vicinity of the constant velocity joint wherein the process cartridge is attached to the printer body.

FIG. 15A is a schematic configuration diagram illustrating the vicinity of the constant velocity joint 130 wherein the process cartridge 1 is not attached to the printer body. FIG. 15B is a schematic configuration diagram illustrating the vicinity of the constant velocity joint 130 wherein the process cartridge 1 is attached to the printer body.

A front plate 71 (not shown) is opened, and the process cartridge 1 is inserted into the printer body. Thus, as shown in FIG. 15A, a guide pin 76 extending from a rear plate 70 is inserted into a guide hole 90a of the process cartridge 1. With the guide pin 76 inserted in the guide hole 90a, the process cartridge 1 is further inserted into the apparatus body, so that the process cartridge 1 is guided by the guide pin 76 to a position where the outer ring 140 can engage the cage 150.

Thus the insertion portion 151 of the cage 150 is inserted into the annular space 144 of the outer ring 140. In this step, if there is a phase difference between the balls 152 and the track grooves (the inner grooves 146 and the outer grooves 145), the balls 152 are guided by the inner wall tapered portions 146a, and the cage 150 or the outer ring 140 is rotated by the movement of the process cartridge 1 in the insertion direction. Thus the phase of the balls 152 matches the phase of the track grooves (the inner grooves 146 and the outer grooves 145).

When the phase of the balls 152 matches the phase of the track grooves (the inner grooves 146 and the outer grooves 145), the insertion portion 151 of the cage 150 is inserted into the annular space 144 of the outer ring 140, so that the three balls 152 held by the insertion portion 151 of the cage 150 are engaged in the annular space 144 by the corresponding outer grooves 145 and inner grooves 146. Thus the process cartridge 1 is positioned in the radial direction relative to the apparatus body and is attached inside the apparatus body.

Because the photoreceptor shaft 172 of the photoreceptor 2 is used as a main reference for positioning the process cartridge 1 relative to the apparatus body, it is possible to prevent misalignment of the photoreceptor shaft 172 and the output shaft 81a. However, in case the rear plate 70 is attached to the apparatus body at an angle due to an assembly error or a manufacturing error, the output shaft 81a is tilted, so that an offset angle is formed between the output shaft 81a and the photoreceptor shaft 172.

In this embodiment, the constant velocity joint 130 is used for connecting the output shaft 81a and the photoreceptor shaft 172. Therefore, even if an offset angle is formed between the output shaft 81a and the photoreceptor shaft 172, a velocity fluctuation factor is eliminated by the sliding movement of the balls 152 in the axial direction in the annular space 144 between the inner outer grooves 145 and the inner grooves 146 of the outer ring 140, thereby enabling constant speed rotation of the photoreceptor shaft 172. It is therefore possible to rotate the photoreceptor 2 at a constant speed and prevent image defects such as uneven density without improving the attachment accuracy and parts accuracy for preventing formation of the offset angle θ. Accordingly, it is possible to prevent image defects such as uneven density while reducing the production cost and the parts cost.

The constant velocity joint 130 includes three components, namely, the outer ring 140, the cage 150, and the balls 152. That is, it is possible to achieve constant speed rotation of the photoreceptor shaft 172 and connection between the photoreceptor shaft 172 and the output shaft 81a using a small number of components, thereby realizing a reduction in the cost of the apparatus.

In the case where the constant velocity joint 130 is used for connection between a removable unit and a drive device, it is preferable to attach the outer ring 140 to a shaft of a rotating body of the removable unit. With this configuration, the outer ring 140 having a shorter service life than the cage 150 can easily be removed from the apparatus body together with the process cartridge 1. That is, the outer ring 140 can easily be replaced, so that maintenance is facilitated.

The constant velocity joint 130 of the above-described embodiment of the present invention can be used as a connection unit for connecting a developing roller shaft of a developing unit removable from the apparatus body and a drive shaft, a connection unit for connecting a fixing roller shaft of a fixing unit removable from the apparatus body and a drive shaft, a connection unit for connecting a secondary transfer roller shaft of a secondary transfer unit removable from the apparatus body and a drive shaft, a connection unit for connecting a drive roller shaft of an intermediate transfer unit removable from the apparatus body and a drive shaft, etc. The constant velocity joint 130 of the above-described embodiment of the present invention can also be used as a connection unit for connecting the roller shaft of the developing roller of the developing unit and a drive shaft in the apparatus body.

Figure 16:
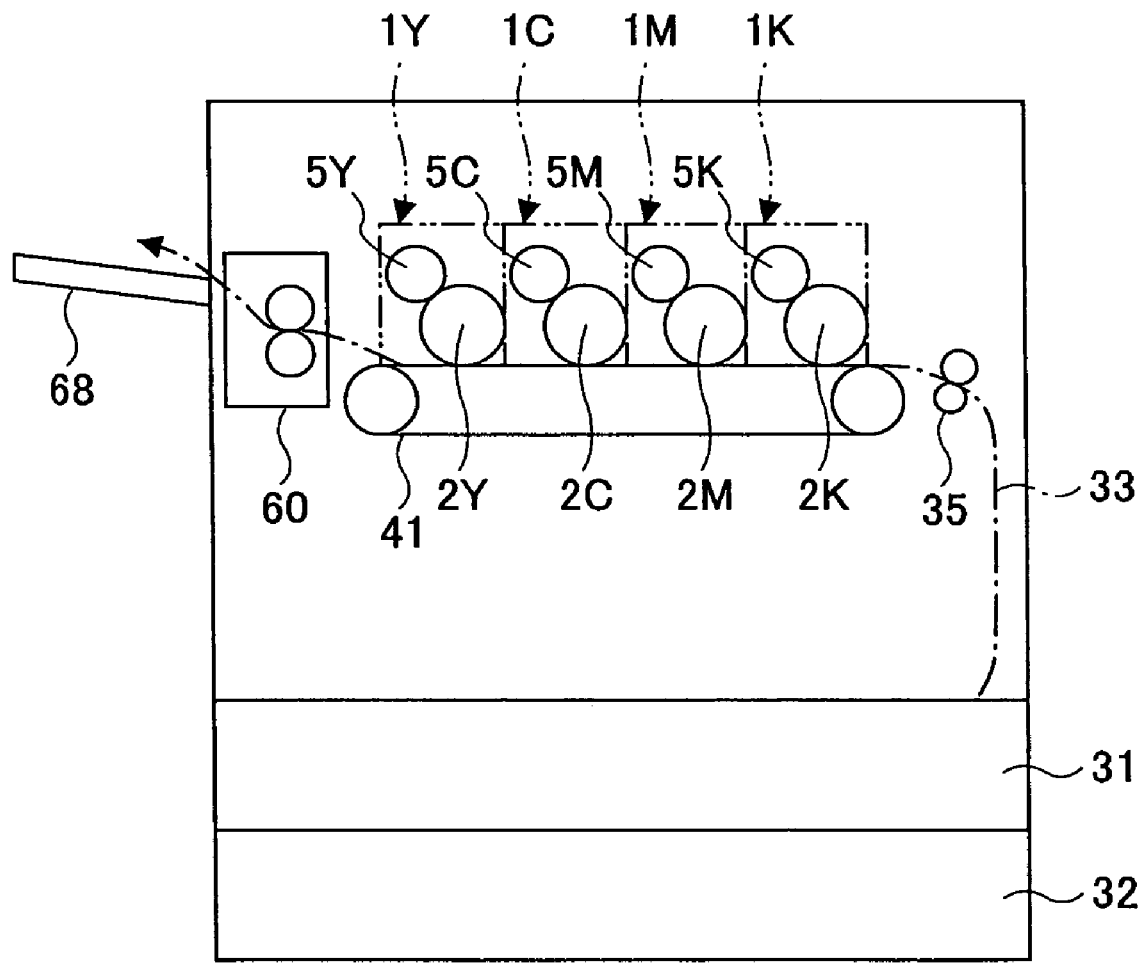
FIG. 16 is a schematic diagram illustrating a tandem type direct transfer color image forming apparatus.
Figure 17:
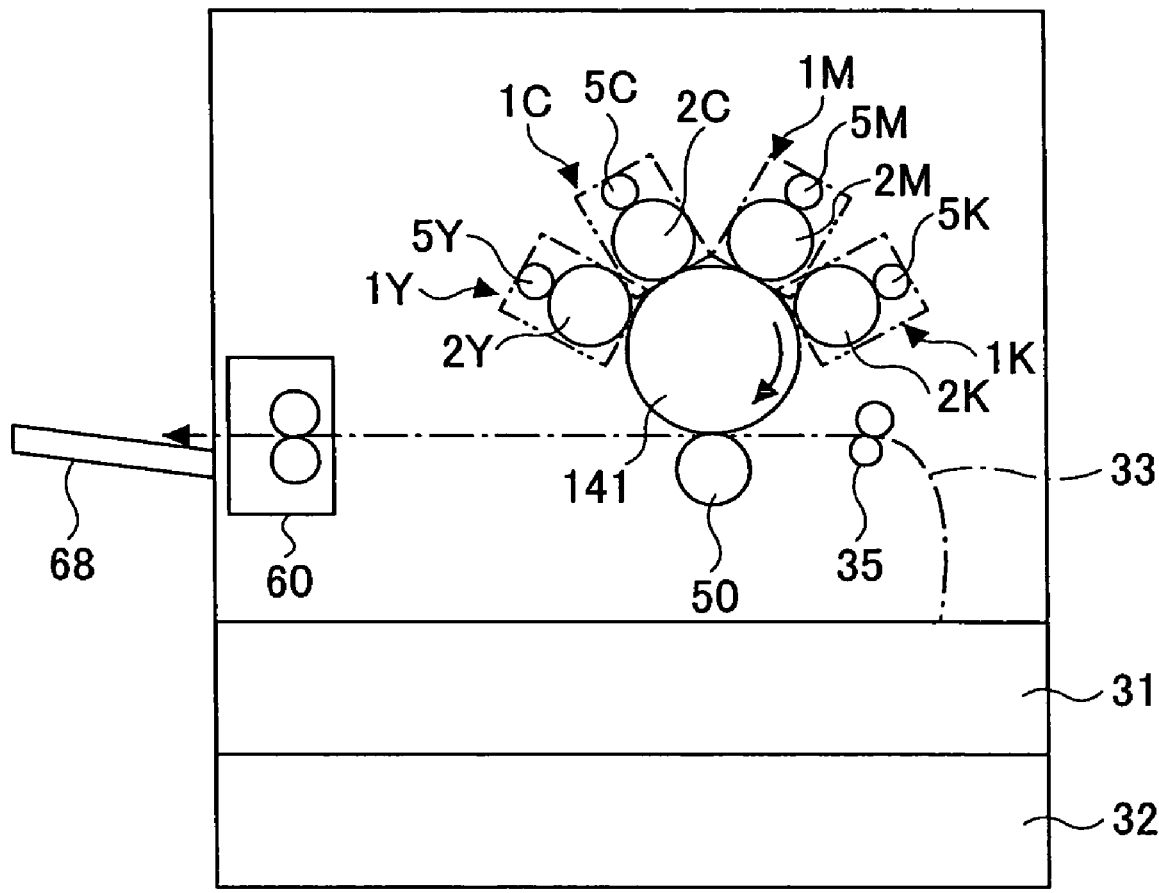
FIG. 17 is a schematic diagram illustrating a tandem type intermediate transfer color image forming apparatus using an intermediate transfer drum.
Figure 18:
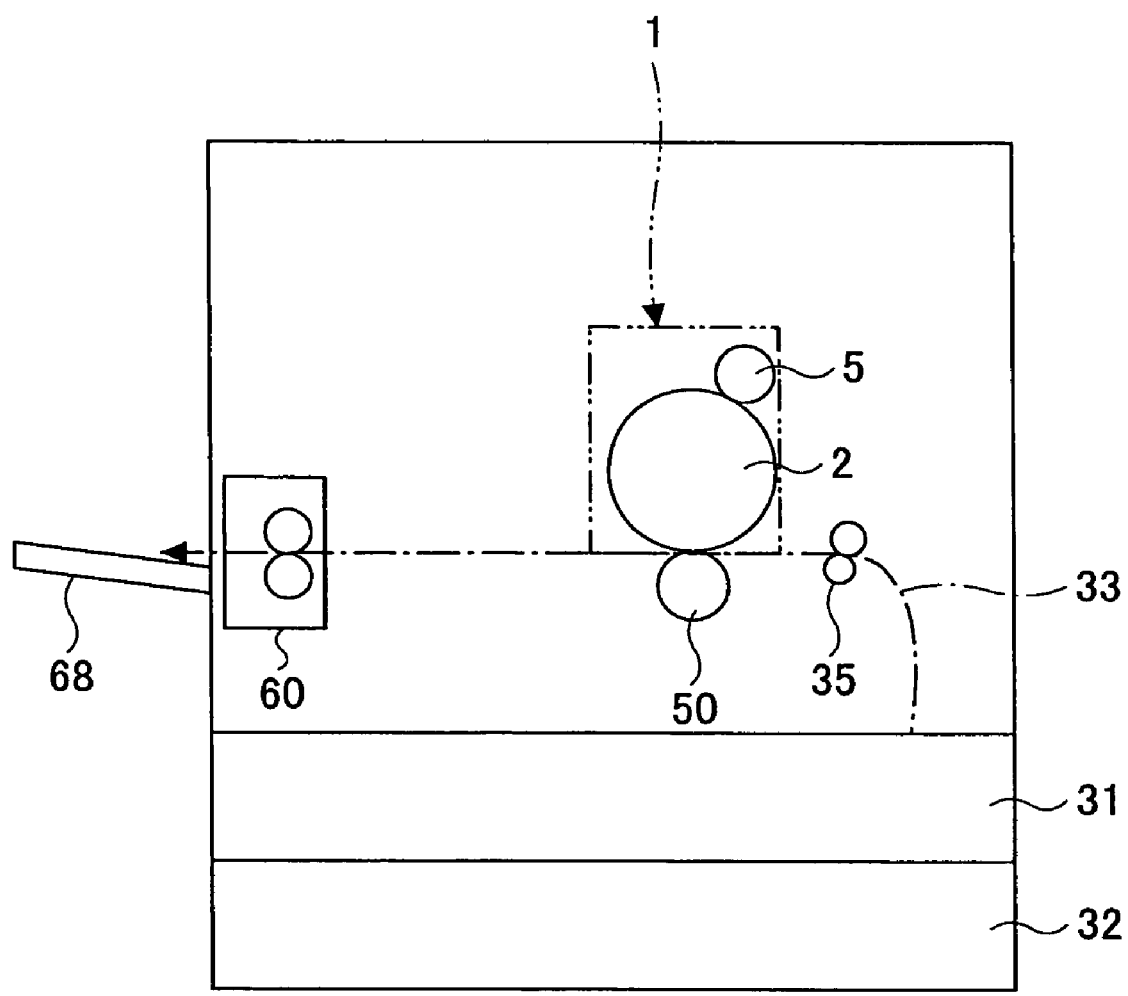
FIG. 18 is a schematic diagram illustrating a monochrome image forming apparatus.
Figure 19:
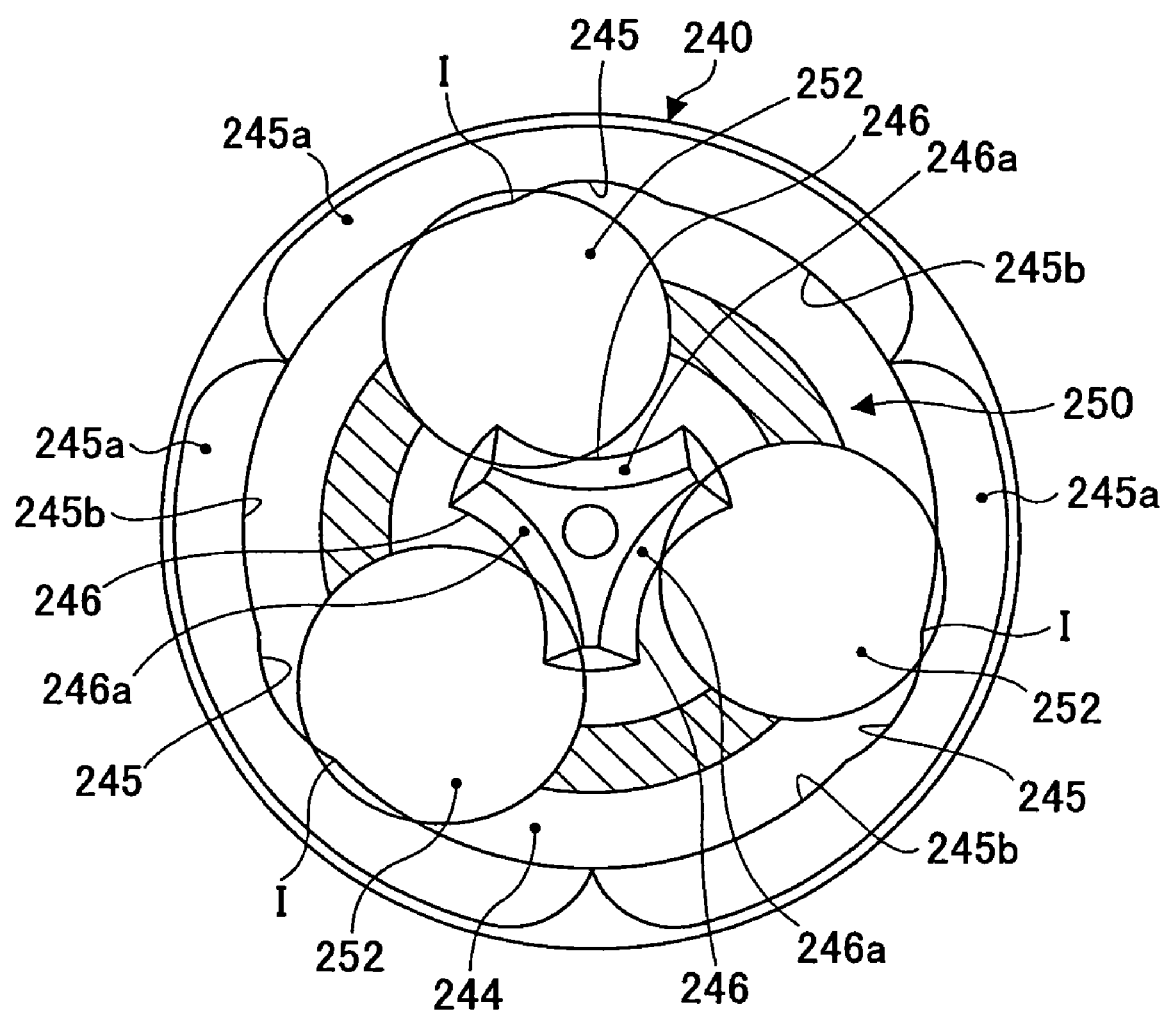
FIG. 19 is a diagram illustrating how a ball held by a cage engages an annular space of an outer ring according to a related-art constant velocity joint.
Figure 20:
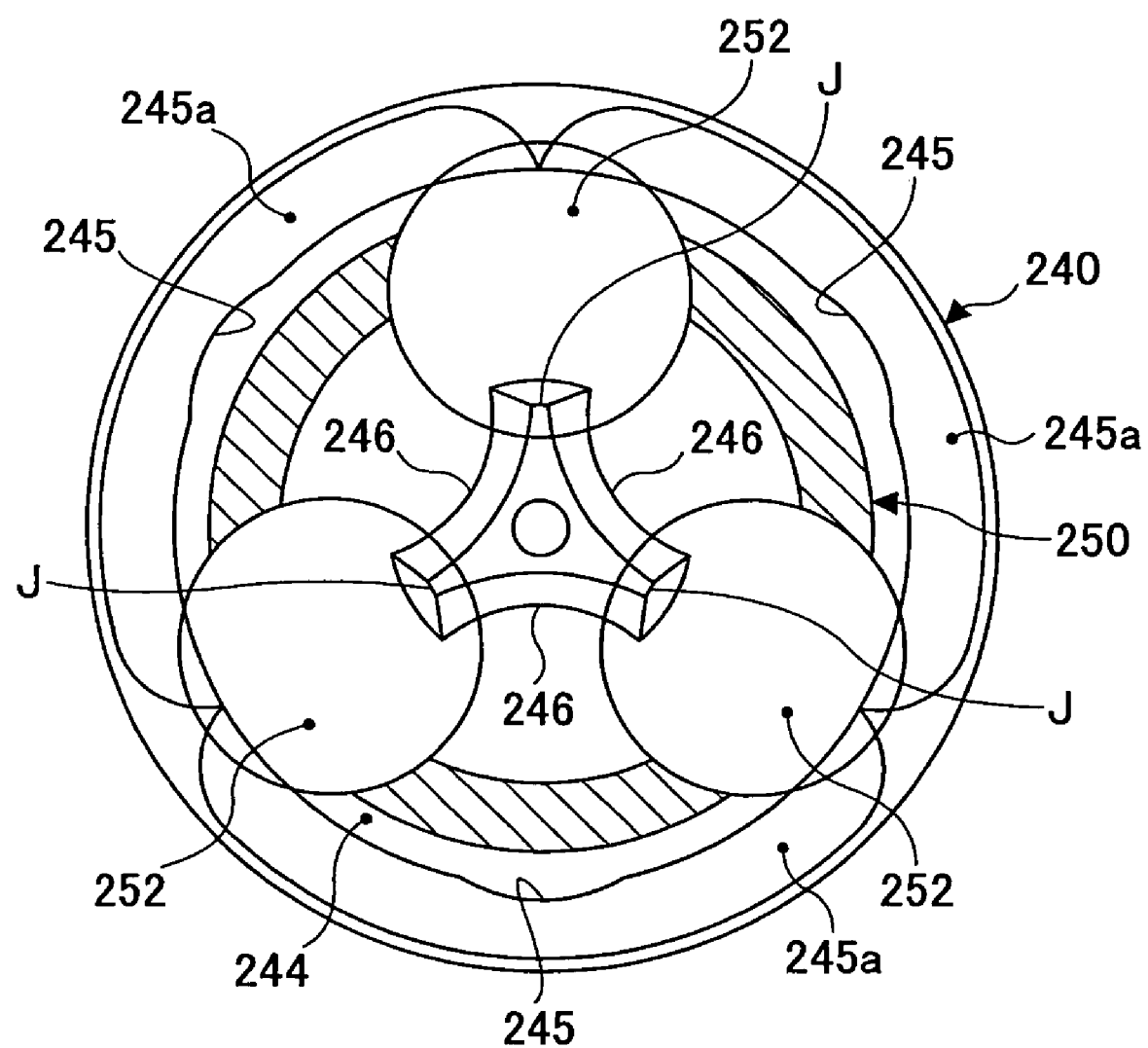
FIG. 20 is a diagram illustrating how the ball held by the cage engages the annular space of the outer ring according to the related-art constant velocity joint when there is an about 60° phase difference between the ball and track grooves.

The present invention is applicable to a color image forming apparatus shown in FIG. 17 using a drum type intermediate transfer body 141 in place of the intermediate transfer belt 41 of the tandem type intermediate transfer electrophotographic color image forming apparatus. The present invention is also applicable to a tandem type direct transfer color image forming apparatus shown in FIG. 16. The present invention is also applicable to a direct transfer monochrome image forming apparatus shown in FIG. 19 that includes a single process cartridge 1 such as the one described above and is configured to form an image on a photoreceptor 2 as an image carrier, transfers the image using a transfer roller 50, and records the image on a recording medium.

According to the constant velocity joint of this embodiment, because the open-side end point f of the inner groove 146 is closer to the open end than the open-side end point e of the outer groove 145 is, the ball 152 engages first the inner groove 146 and then the outer groove 145. Therefore, when the ball 152 engages the outer groove 145, the phase of the ball 152 is already matched with the phase of the outer groove 145, and the ball 152 does not become lodged at the junction I (see FIG. 7) of the axial edge of the outer wall tapered portion 145a and an edge of the outer groove 145. This reduces the insertion resistance of the ball 152 held by the cage 150 into the annular space 144 between the outer groove 145 and the inner groove 146 of the outer ring 140, thereby allowing smooth insertion of the ball 152 into the annular space 144 between the outer groove 145 and the inner groove 146 of the outer ring 140.

The outer wall tapered portion 145a is formed at the open end portion of the inner periphery of the cup portion 141 as the outer wall of the annular space 144 such that the diameter of the annular space 144, defined by the distance between the inner wall and the opposite outer wall of the annular space 144, increases from the open-side end point e of the outer groove 145 toward the open end of the inner periphery. With this configuration, even if the ball 152 comes into contact with the open end of the cup portion 141 upon insertion of the ball 152 into the annular space 144 of the outer ring 140, the ball 152 can be guided by the outer wall tapered portion 145a such that the phase of the ball 152 matches the phase of the grooves.

As shown in FIG. 5, the inclination angle θ1 of the outer wall tapered portion 145a relative to the opening surface of the annular space 144 is made greater than the inclination angle θ2 of the inner wall tapered portion 146a relative to the opening surface of the annular space 144. With this configuration, it is possible to guide the ball 152 to the outer groove 145 and the inner groove 146 by only the inner wall tapered portion 146a when inserting the ball 152 into the annular space 144 with the central axis of the outer ring 140 and the central axis of the cage 150 being aligned. Thus, the outer ring 140 can be rotated more smoothly than in the case where the ball 152 is guided by being brought into contact with both the inner wall tapered portion 146a and the outer wall tapered portion 145a. This reduces the insertion resistance of the ball 152 held by the cage 150 into the annular space 144 between the outer groove 145 and the inner groove 146 of the outer ring 140, thereby allowing smooth insertion of the ball 152 into the annular space 144 between the outer groove 145 and the inner groove 146 of the outer ring 140.

The cage 150 includes the through holes 151a (ball holding holes) having a diameter greater than a diameter of the balls 152 and the retaining projections 151b projecting from the inner surfaces of the through holes 151a to prevent the balls 152 from coming out of the through holes 151a. This configuration allows smooth rotation of the balls 152 relative to the through holes 151a and prevents the balls 152 from coming out from the outer periphery of the insertion portion 151 of the cage 150.

The edges of the adjacent inner wall tapered portions 146a intersect at the open end of the inner boss portion 143. With this configuration, when connecting the cage 150 and the outer ring 140, the ball 152 can come into contact with the open end of the inner wall tapered portion 146a even if there is a phase difference of about 60° between the ball 152 and the track grooves (the outer groove 145 and the inner groove 146). Therefore, even if there is a phase difference of about 60° between the ball 152 and the track grooves (the inner groove 146 and the outer groove 145), part of an axial force that is applied to the inner boss portion 143 can be converted into a rotational force by the inner wall tapered portion 146a, thereby allowing smooth rotation of the outer ring 140 relative to the cage 150. This reduces the insertion resistance of the ball 152 held by the cage 150 into the annular space 144 between the outer groove 145 and the inner groove 146 of the outer ring 140, thereby allowing smooth insertion of the ball 152 into the annular space 144 between the outer groove 145 and the inner groove 146 of the outer ring 140.

The side faces 149 between adjacent inner wall tapered portions 146 may be tapered such that the diameter of the annular space 144 increases toward the open end. This configuration increases the thickness of regions around the points G of the open end of the inner boss portion 143. Therefore, it is possible to prevent the open end of the inner boss portion 143 from being broken upon the balls 152 hitting the regions around the points G of the inner boss portion 143.

As shown in FIG. 12, the junction of the inner groove 146 and the inner wall tapered portion 146a may be formed to have an arcuate shape in the axial cross section of the outer ring 140. In this case, the risk of the ball 152 becoming lodged at the junction of the inner groove 146 and the inner wall tapered portion 146a is lower than in the case where the junction of the inner groove 146 and the inner wall tapered portion 146a has an angular shape indicated by the dotted line in FIG. 12. Thus it is possible to smoothly engage the ball 152 in the inner groove 146. Further, as shown in FIG. 12, the junction of the outer groove 145 and the outer wall tapered portion 145a may have an arcuate shape to allow smooth engagement of the ball 152 and the outer groove 145.

When inserting the ball 152 into the annular space 144 of the outer ring 140 coaxially aligned with the cage 150, the ball 152 comes into contact with the inner wall tapered portion 146a first. With this configuration, even if the outer wall tapered portion 145a has the shape as shown in FIG. 13, or even if there is a phase difference of about 60° between the ball 152 and the grooves, it is possible to smoothly rotate the outer ring 140, thereby reducing the insertion resistance.

The above-described constant velocity joint 130 may be used as a connection unit to connect a driven shaft of the process cartridge 1, which is a removable unit, to a drive shaft that is rotated with a drive force applied from a drive source disposed in the apparatus body. With this configuration, even if an offset angle is formed between the driven shaft and the drive shaft, it is possible to rotate the driven shaft at a constant speed, thereby producing a high quality image without defects such as uneven density.

The present application is based on Japanese Priority Application No. 2007-215281 filed on Aug. 21, 2007, with the Japanese Patent Office, the entire contents of which are hereby incorporated herein by reference.

What is claimed is:

1. A constant velocity joint, comprising:
an outer ring including an annular space with an open end, plural outer grooves axially extending in an outer wall of the annular space and being equally spaced from each other in a circumferential direction, and plural inner grooves axially extending in an inner wall of the annular space and facing the respective outer grooves; and
a cage configured to hold balls that slide along the inner walls and the outer walls;
wherein the outer ring and/or the cage is made of a synthetic resin;
wherein a drive force of one of the cage and the outer ring is transmitted to the other one of the cage and the outer ring when part of the cage is inserted in the annular space and the balls held by the cage are engaged in the inner grooves and the outer grooves;
wherein the inner wall includes an extension portion extending from open-side end points of the inner grooves toward the cage;
wherein inner wall tapered portions extending from the open-side end points of the corresponding inner grooves toward an open end of the inner wall are formed in the extension portion such that a diameter of the annular space and a groove width of the inner wall tapered portions increase from the open-side end points of the inner grooves toward the open end of the inner wall;
wherein the outer wall includes another extension portion extending from the open-side end points of the outer grooves toward the cage;
wherein outer wall tapered portions extending from the open-side end points of the corresponding outer grooves toward an open end of the outer wall are formed in the extension portion such that an outer diameter of the annular space increases from the open-side end points of the outer grooves toward the open end of the outer wall;
wherein the open-side end points of the inner grooves are closer to the open end of the annular space than the open-side end points of the outer grooves; and
wherein an inclination angle of the outer wall tapered portions relative to an opening surface of the annular space is greater than an inclination angle of the inner wall tapered portions relative to the opening surface of the annular space.

2. The constant velocity joint as claimed in claim 1, wherein edges of the adjacent inner wall tapered portions intersect at the open end of the inner wall.

3. The constant velocity joint as claimed in claim 2, wherein a side face between adjacent inner wall tapered portions is tapered such that the diameter of the annular space increases toward the open end of the inner wall.

4. The constant velocity joint as claimed in claim 1, wherein the cage includes ball holding holes having a diameter greater than a diameter of the balls and retaining projections each projecting from inner surfaces of the ball holding holes to prevent the balls from coming out of the ball holding holes.

5. The constant velocity joint as claimed in claim 1, wherein a junction of the inner groove and the inner wall tapered portion is formed to have an arcuate shape in an axial cross section of the outer ring.

6. The constant velocity joint as claimed in claim 1, wherein
the plural outer grooves extend in the outer wall of the annular space at 120° angular intervals in a circumferential direction, and the plural inner grooves extend in the inner wall of the annular space and face the respective plural of outer grooves.

7. The constant velocity joint as claimed in claim 6, wherein when inserting the ball holding portion into the annular space of the outer ring coaxially aligned with the cage, the balls come into contact with the inner wall tapered portions first and then with the outer wall of the annular space.

8. The constant velocity joint as claimed in claim 6, wherein a side face between adjacent inner wall tapered portions is tapered such that the diameter of the annular space increases toward the open end of the inner wall.

9. The constant velocity joint as claimed in claim 6, wherein the plural outer grooves have three outer grooves axially extending in the outer wall of the annular space in a circumferential direction, and the plural inner grooves have three inner grooves axially extending in the inner wall of the annular space and facing the respective plural of outer grooves.

10. The constant velocity joint as claimed in claim 6, wherein the cage including the ball holding portion configured to hold balls such that the balls slide along the inner walls and the outer walls at 120° angular intervals in the circumferential direction.

11. An image forming apparatus, comprising:
a unit that includes a rotating body and is removably attached to an apparatus body; and
a connection unit configured to connect a driven shaft provided in the unit to a drive shaft provided in the apparatus body, the driven shaft being configured to transmit a drive force to the rotating body, the drive shaft being configured to be rotated by a drive force of a drive source;
wherein the connection unit is the constant velocity joint of claim 1.

* * * * *